(12) United States Patent
Khalil et al.

(10) Patent No.: US 9,537,661 B2
(45) Date of Patent: Jan. 3, 2017

(54) PASSWORD-LESS AUTHENTICATION SERVICE

(71) Applicant: Verizon Patent and Licensing Inc., Basking Ridge, NJ (US)

(72) Inventors: Manah M. Khalil, Irving, TX (US); Vijaya R. Challa, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/208,159

(22) Filed: Mar. 13, 2014

(65) Prior Publication Data

US 2015/0249540 A1 Sep. 3, 2015

Related U.S. Application Data

(60) Provisional application No. 61/946,665, filed on Feb. 28, 2014.

(51) Int. Cl.

| | |
|---|---|
| *H04L 9/32* | (2006.01) |
| *H04L 29/06* | (2006.01) |
| *G06F 21/34* | (2013.01) |
| *G06F 21/35* | (2013.01) |

(52) U.S. Cl.
CPC ............. *H04L 9/3263* (2013.01); *G06F 21/34* (2013.01); *G06F 21/35* (2013.01); *H04L 9/321* (2013.01); *H04L 9/3268* (2013.01); *H04L 63/0823* (2013.01); *H04L 63/0853* (2013.01); *H04L 63/0876* (2013.01); *H04L 63/18* (2013.01)

(58) Field of Classification Search
CPC .......... G06F 21/34; G06F 21/35; H04L 63/18; H04L 9/3263
See application file for complete search history.

(56) References Cited

U.S. PATENT DOCUMENTS

| | | | |
|---|---|---|---|
| 8,677,466 B1* | 3/2014 | Chuang et al. | 726/9 |
| 2005/0268107 A1* | 12/2005 | Harris et al. | 713/182 |
| 2006/0165060 A1* | 7/2006 | Dua | 370/352 |
| 2009/0259848 A1* | 10/2009 | Williams et al. | 713/168 |
| 2011/0302644 A1* | 12/2011 | Headley | H04L 9/3271 726/7 |
| 2012/0124651 A1* | 5/2012 | Ganesan et al. | 726/4 |

OTHER PUBLICATIONS

Zelig et al., "SlickLogin Joins Google", http://www.slicklogin.com/index.html, Aug. 27, 2013, 4 pages.

* cited by examiner

*Primary Examiner* — Morshed Mehedi
*Assistant Examiner* — Vance Little

(57) ABSTRACT

A device may receive an authentication request generated based on a request to access a service. The authentication request may include a user identifier. The device may identify a mobile device associated with the user identifier. The device may authenticate the mobile device, and may generate an access notification based on authenticating the mobile device. The access notification may include information relating to the request to access the service. The device may provide the access notification to the mobile device, and may receive an access response from the mobile device. The access response may indicate whether to permit access to the service. The device may cause access to the service to be permitted when the access response indicates to permit access to the service, or may cause access to the service to be denied when the access response indicates to deny access to the service.

20 Claims, 26 Drawing Sheets

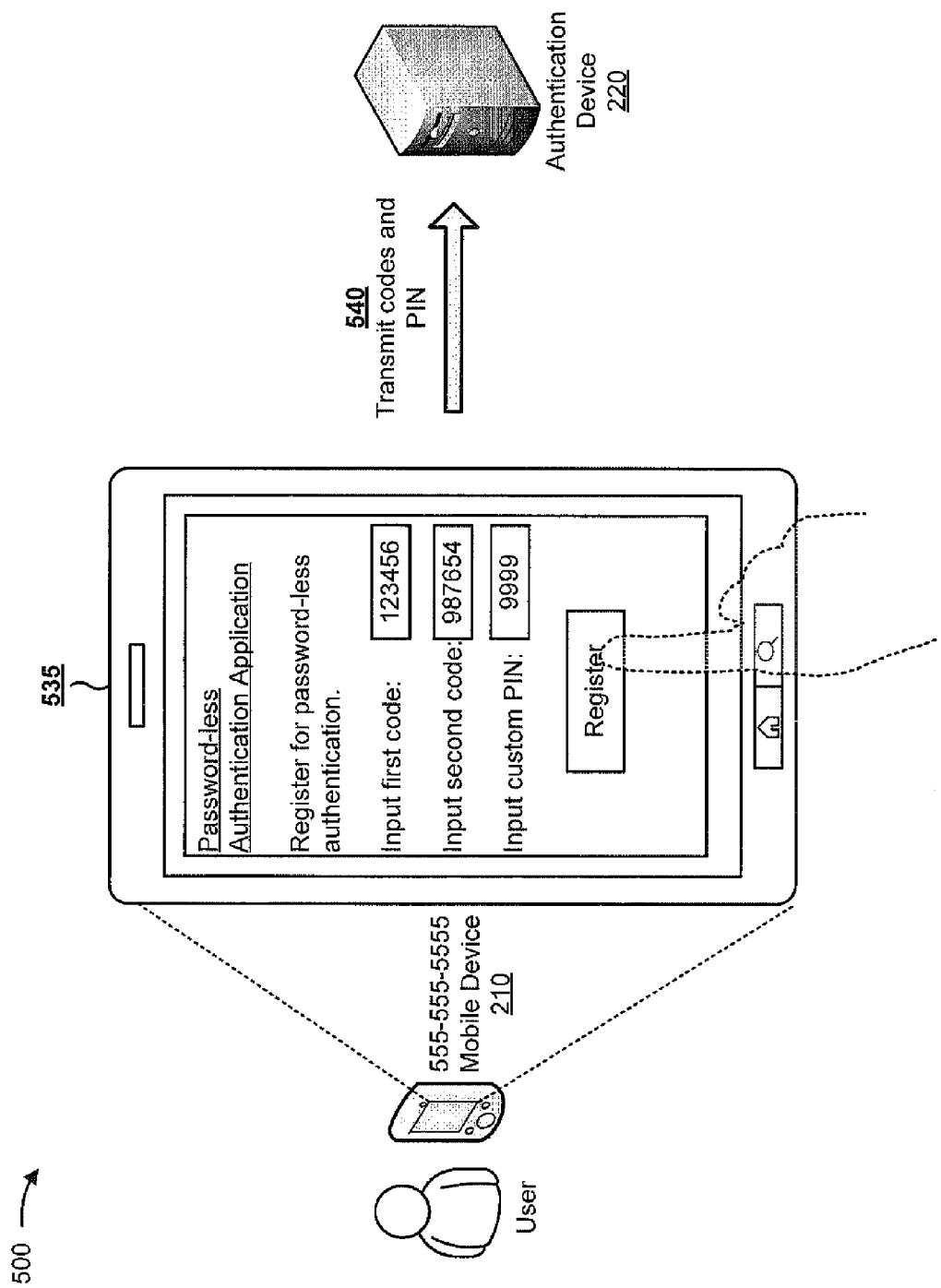

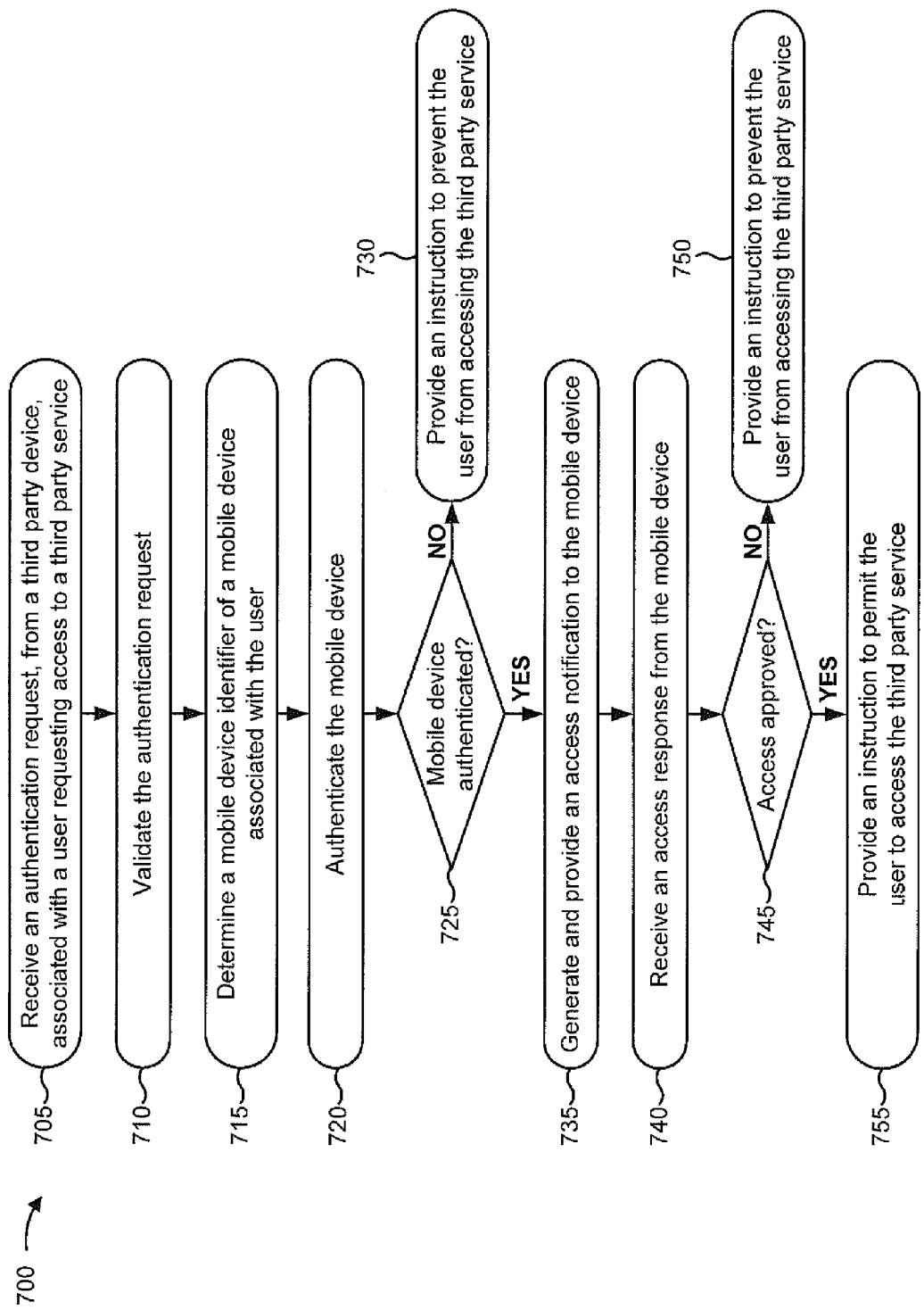

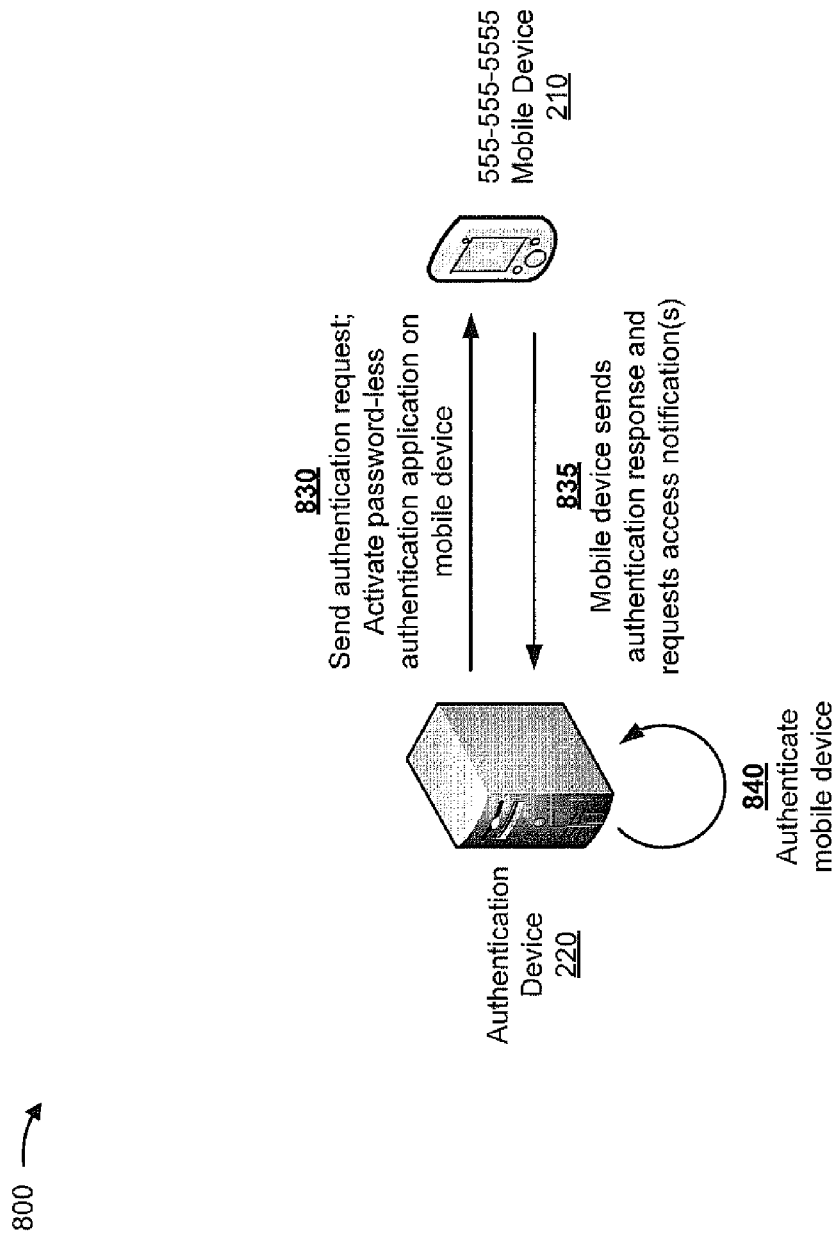

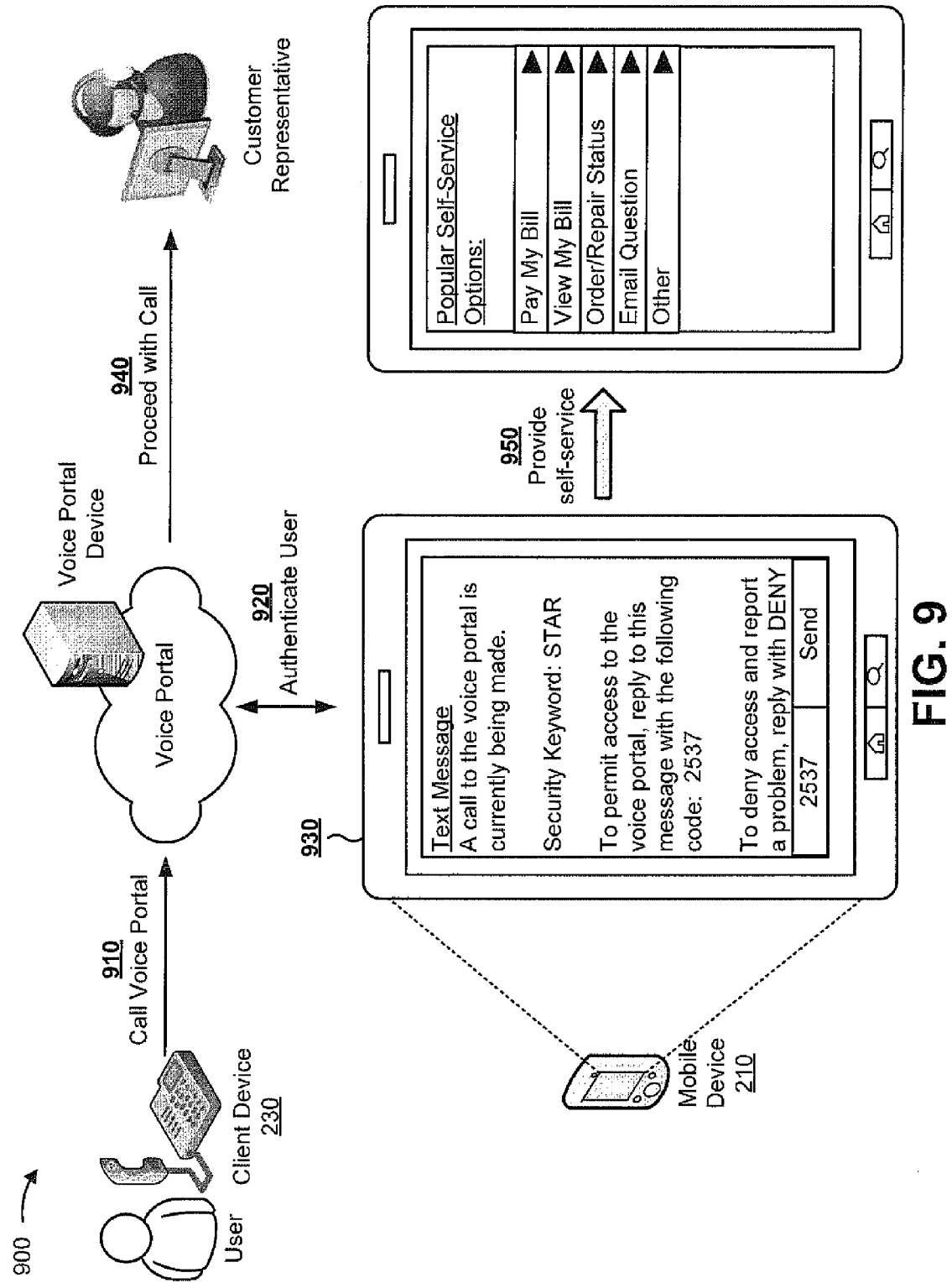

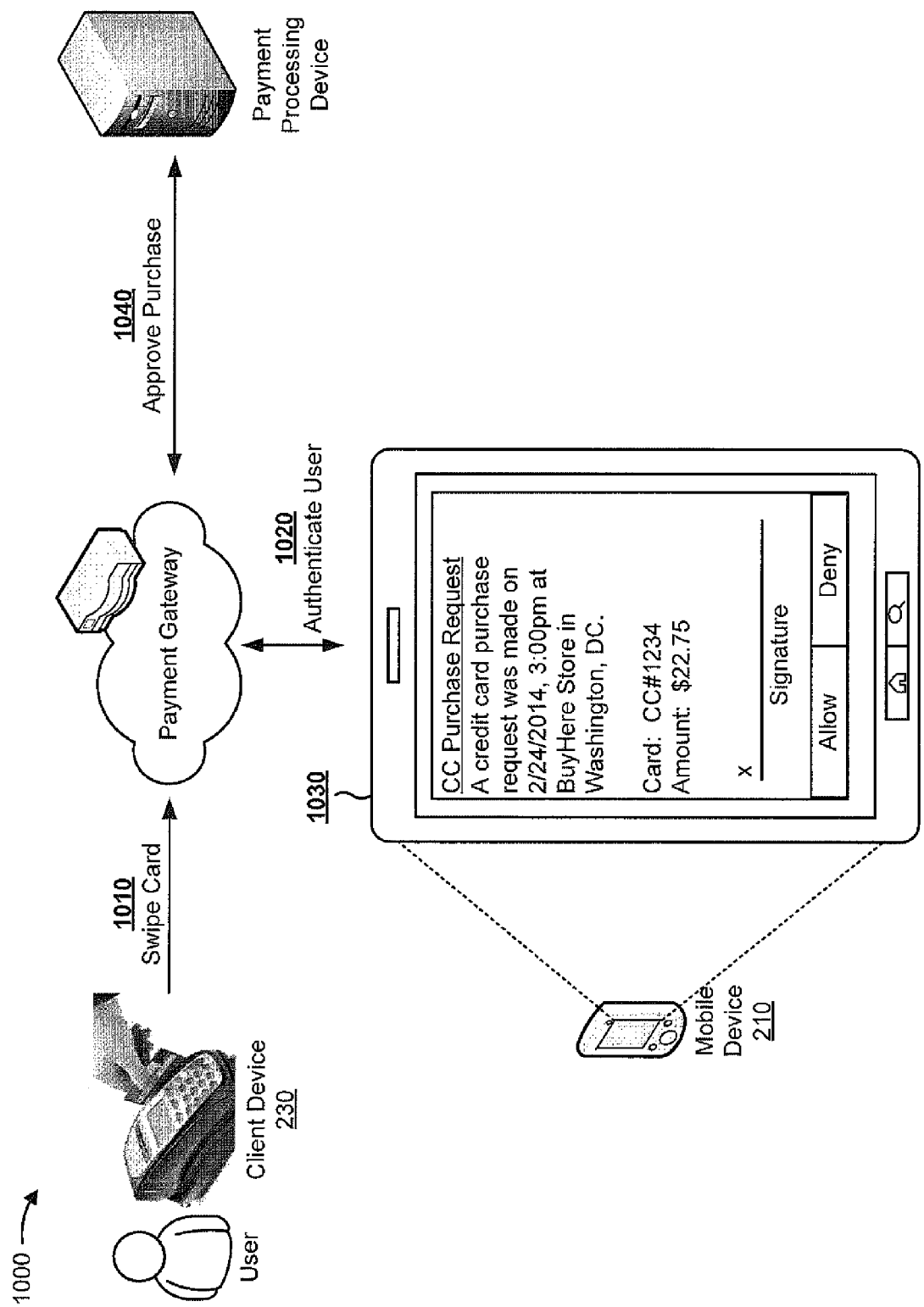

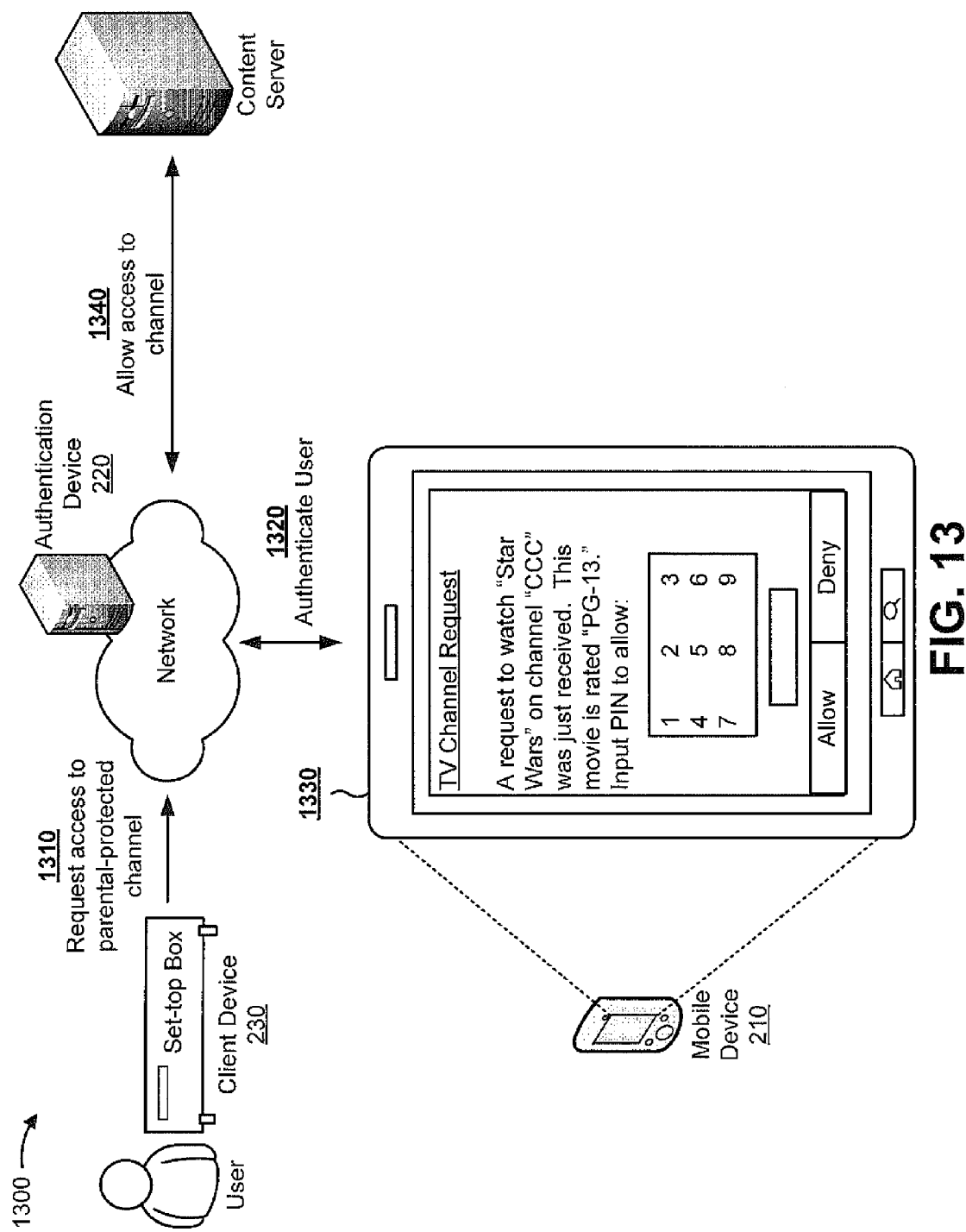

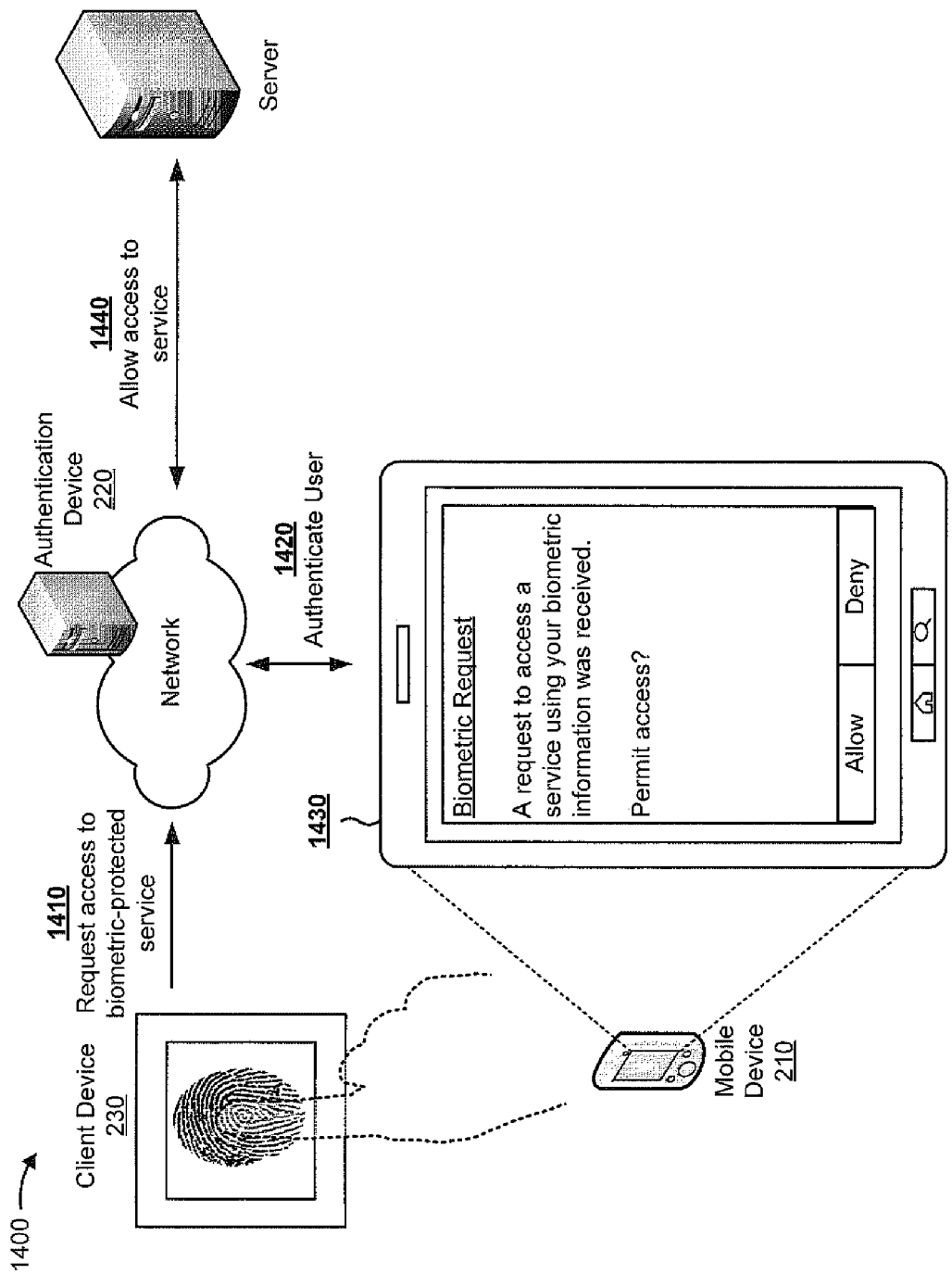

PASSWORD-LESS AUTHENTICATION SERVICE

RELATED APPLICATION

This application claims priority under 35 U.S.C. §119 to U.S. Provisional Patent Application No. 61/946,665, filed on Feb. 28, 2014, the content of which is incorporated by reference herein in its entirety.

BACKGROUND

Passwords may be used for user authentication to prove an identity and/or to gain access to a protected resource. For example, a username and password may be used by a user during a login process that controls access to protected computing devices, operating systems, applications (e.g., email, web sites, etc.), databases, networks, etc.

BRIEF DESCRIPTION OF THE DRAWINGS

FIGS. 5A-5E are diagrams of an example implementation relating to the example process shown in FIG. 4;

FIG. 7 is a flow chart of an example process for using a password-less authentication service;

FIGS. 8A-8F are diagrams of an example implementation relating to the example process shown in FIG. 7; and FIGS. 9-14 are diagrams of other example implementations relating to the example process shown in FIG. 7.

DETAILED DESCRIPTION OF PREFERRED EMBODIMENTS

The following detailed description of example implementations refers to the accompanying drawings. The same reference numbers in different drawings may identify the same or similar elements.

User authentication may be achieved by requiring a user to enter a password in order for the user's identity to be verified. However, requiring a password for user authentication may be inefficient. For example, the user may use a single password for multiple services, which may cause security issues if there is a security breach in one of the services. Alternatively, the user may use different passwords for different services, which may cause the user to forget a password. Also, passwords may be hacked, stolen, forgotten, misplaced, etc. Implementations described herein may reduce user reliance on passwords by providing a mechanism to authenticate a user via a mobile device.

Figure 1A:
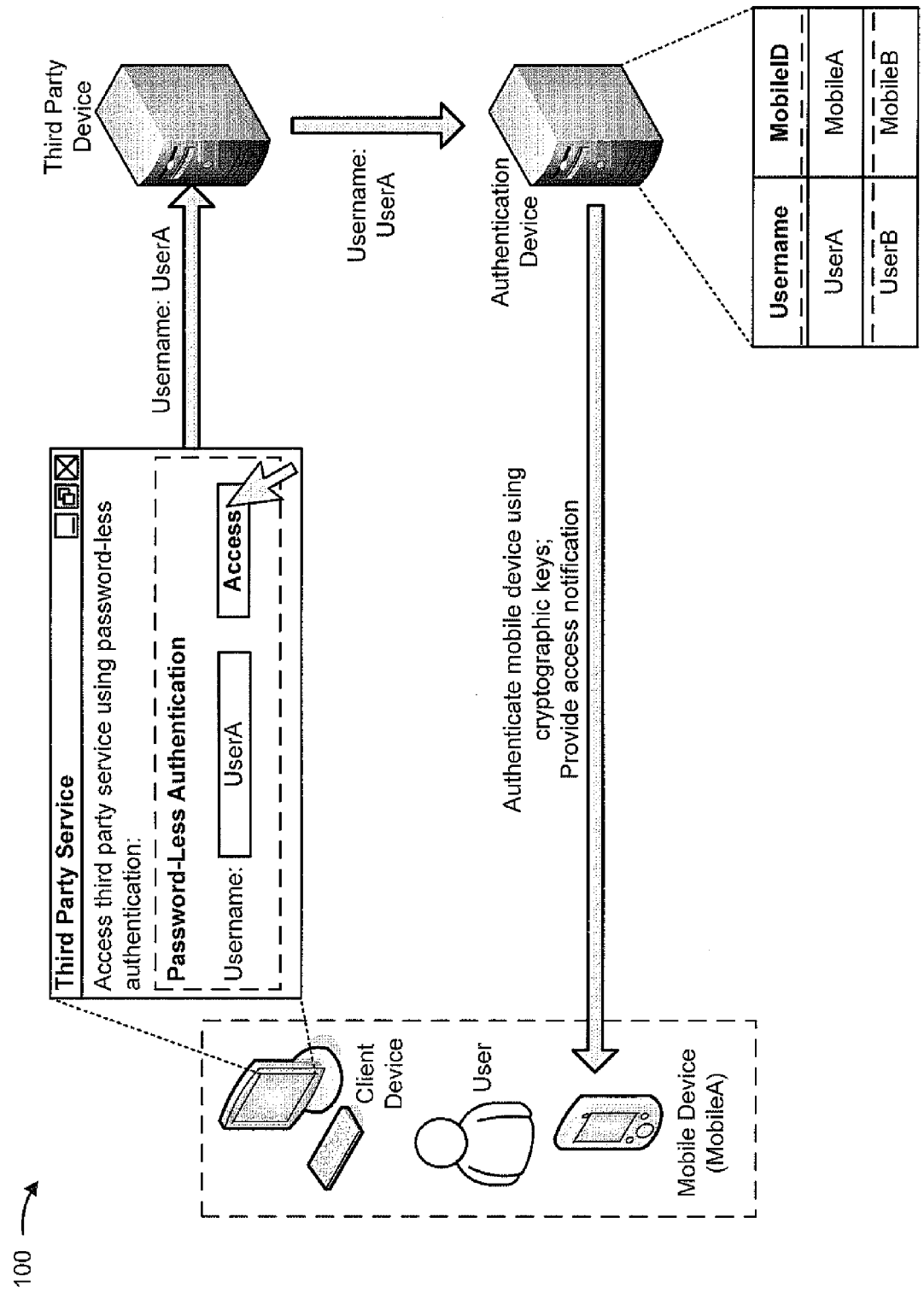
FIGS. 1A and 1B are diagrams of an overview of an example implementation described herein.
Figure 1B:
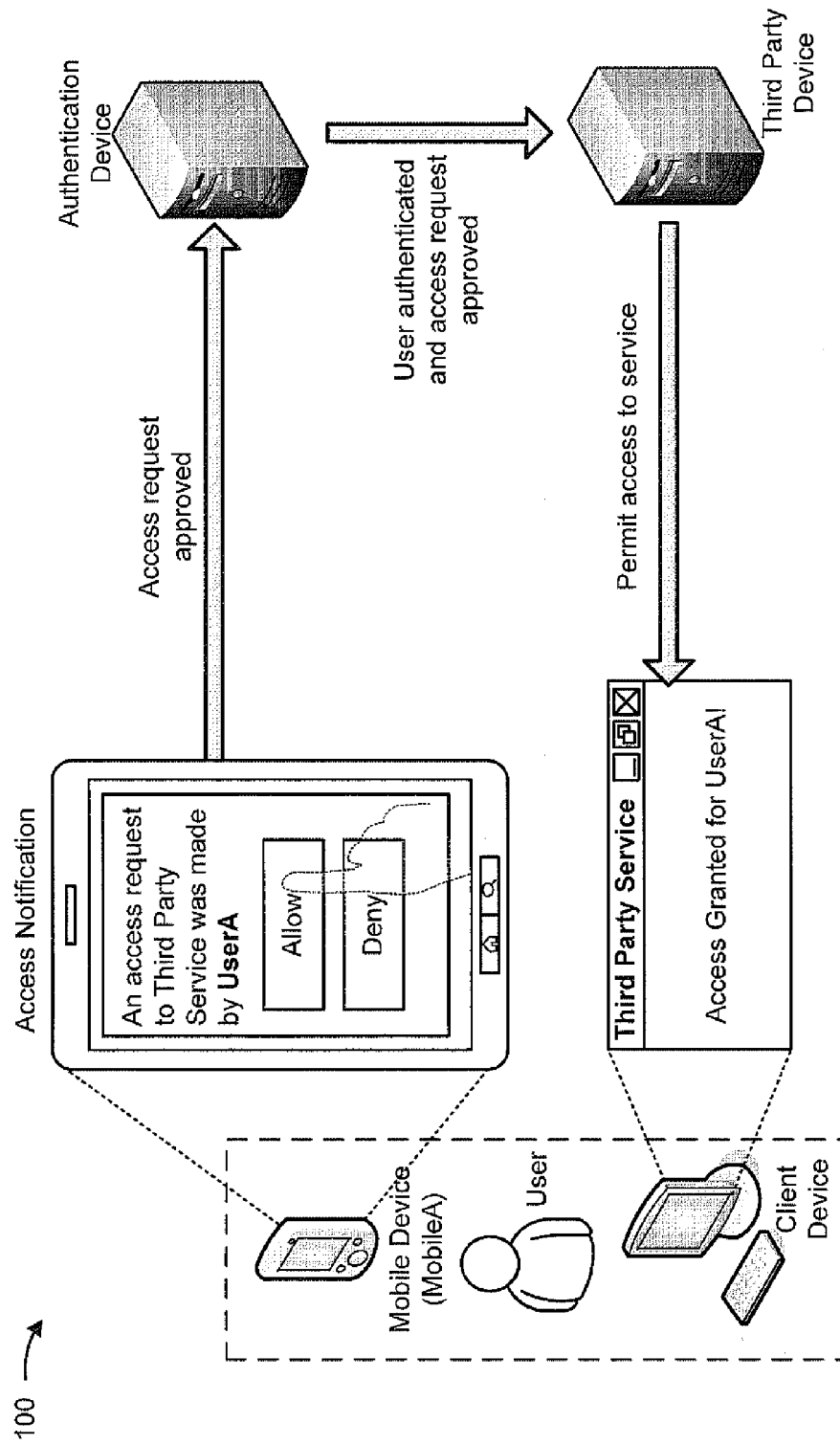

FIGS. 1A and 1B are diagrams of an overview of an example implementation 100 described herein. As shown in FIG. 1A, a user may use a client device to access a third party service, such as a website, a private network, a payment processing system, or the like, using a password-less authentication service. For example, the user may input a username (or another user identifier), and the client device may transmit the username to a third party device that assists in providing the third party service. The third party device may provide the username to an authentication device that assists in providing the password-less authentication service. The authentication device may determine a mobile device identifier (e.g., shown as MobileID) associated with the username, and may exchange messages with a mobile device identified using the mobile device identifier. For example, the authentication device may validate the mobile device using cryptographic keys. Once the mobile device has been validated, the authentication device may provide an access notification to the mobile device.

As shown in FIG. 1B, the mobile device may provide the access notification for display. The access notification may be customizable by the user or the third party, and may indicate that an access request was made using a username associated with the mobile device (e.g., UserA). The user may interact with the mobile device and the access notification to allow or deny access to the third party service. As shown, assume that the user interacts with the mobile device to allow access to the third party service. Based on this interaction, the mobile device sends the authentication device an indication that the access request was approved. The authentication device notifies the third party device that the user has been authenticated and that the access request has been approved. The third party device then permits the client device to access the service. In this way, the user may securely access protected resources without using a password.

Figure 2:
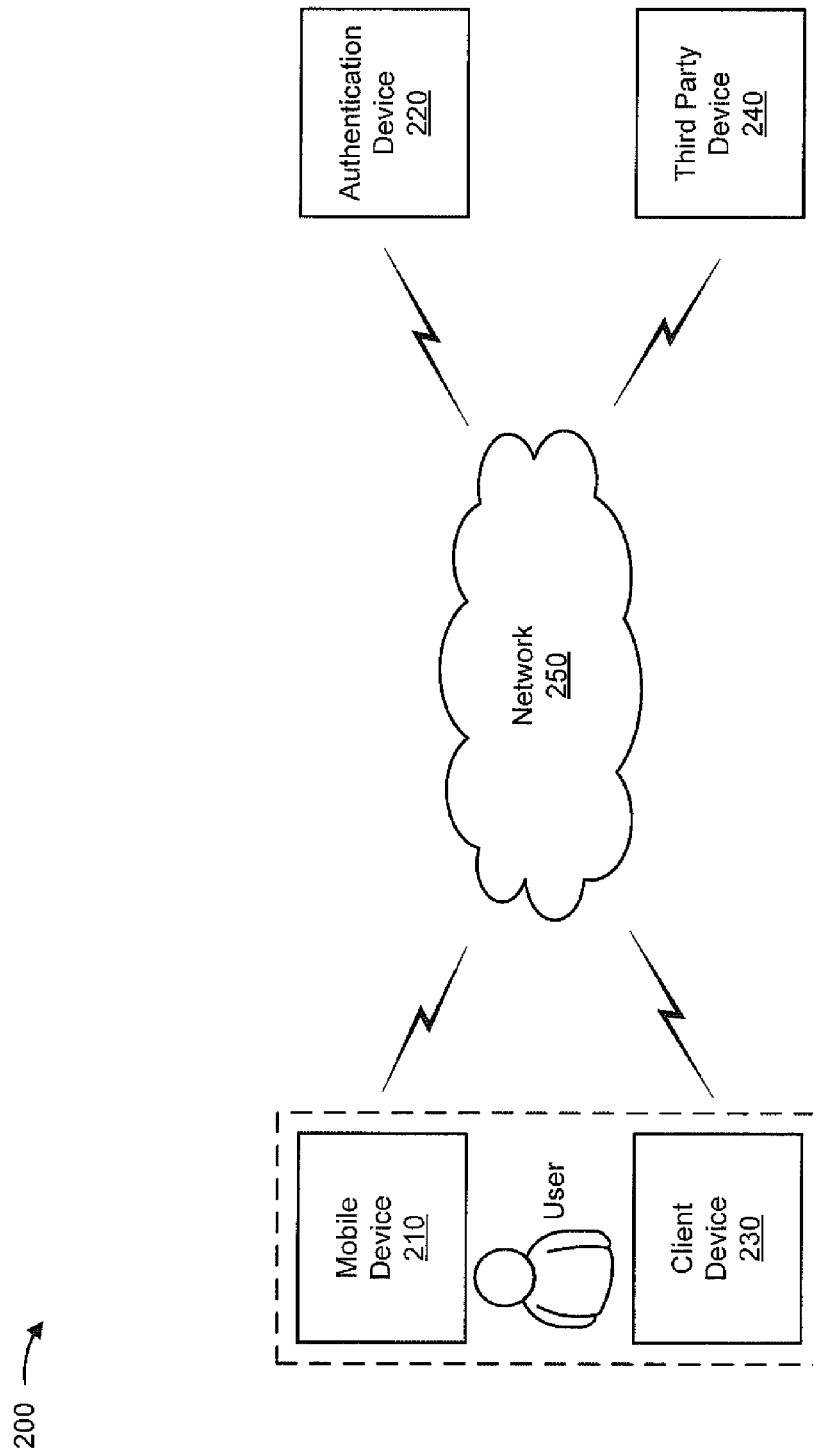
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a mobile device 210, an authentication device 220, a client device 230, a third party device 240, and a network 250. As further shown, mobile device 210 and client device 230 may be associated with the same user. Devices of environment 200 may interconnect via wired connections, wireless connections, or a combination of wired and wireless connections.

Mobile device 210 may include one or more devices capable of receiving, generating, storing, processing, and/or providing information associated with a password-less authentication service (e.g., registration information, encrypted information, an access notification, user preferences, and/or other information described herein). For example, mobile device 210 may include a mobile phone (e.g., a smart phone, a radiotelephone, etc.), a tablet computer, a handheld computer, a personal digital assistant, or a similar device. Mobile device 210 may be registered for a password-less authentication service provided via authentication device 220. Once registered, mobile device 210 may be authenticated using authentication device 220 (e.g., using public key cryptography, a digital certificate, etc.) when a user, associated with mobile device 210, uses client device 230 to attempt to access a service provided via third party device 240.

Authentication device 220 may include one or more devices capable of receiving, generating, storing, processing, and/or providing information associated with a password-less authentication service, and/or capable of authenticating a user and/or a device using the password-less authentication service. For example, authentication device 220 may include a computing device, such as a server (e.g., an authentication server, a firewall, etc.), a desktop computer, a laptop computer, a tablet computer, a handheld computer, or a similar device. Authentication device 220 may register mobile device 210, associated with a user, for a password-less authentication service. Additionally, or alternatively, authentication device 220 may register third party device 240, associated with a third party, for the password-less authentication service. Authentication device 220 may authenticate the user, associated with mobile device 210, when the user uses client device 230 (or mobile device 210) to attempt to access a service provided via third party device 240.

Client device 230 may include a device capable of receiving, generating, storing, processing, and/or providing information associated with a password-less authentication service. In some implementations, client device 230 may include one or more devices used to provide access to a third party service. For example, client device 230 may include a computing device, such as a desktop computer, a laptop computer, a tablet computer, a handheld computer, a phone (e.g., a mobile phone, a smart phone, a radiotelephone, a wireline phone, etc.), or a similar device. Additionally, or alternatively, client device 230 may include an automated teller machine (ATM), a card reader (e.g., a credit card reader), a set-top box, a device that controls whether a vehicle (e.g., a car) may be started, a device that controls access to a building (e.g., a security system), a gaming device, or another device that provides an interface for a user to access a third party service. A user, associated with mobile device 210, may use client device 230 to attempt to access a third party service, provided by third party device 240, using a password-less authentication service. Third party device 240 may request that authentication device 220 authenticate the user using the password-less authentication service, and may receive an indication that the user has been authentication when authentication device 220 validates the user via mobile device 210.

Third party device 240 may include one or more devices capable of receiving, generating, storing, processing, and/or providing information associated with a third party service and/or a password-less authentication service. For example, server device 240 may include a computing device, such as a server (e.g., a content server, a web server, a host server, a database server, a voice portal server, a payment processing server, a credit card processing server, etc.), a security device (e.g., a firewall, a gateway, an access point, etc.), an interactive voice recognition device, or a similar device. Third party device 240 may provide access to a third party service. When a user uses client device 230 to attempt to access a third party service provided by third party device 240, third party device 240 may contact authentication device 220, requesting that the user be authenticated. Authentication device 220 may use information, received from third party device 240, to identify mobile device 210. Authentication device 210 may authenticate mobile device 210 using techniques described herein, and may verify the identity of the user to third party device 240. Third party device 240 may then permit client device 230 to access a service provided by third party device 240.

Network 250 may include one or more wired and/or wireless networks. For example, network 250 may include a cellular network (e.g. a code division multiple access (CDMA) network, a long term evolution (LTE) network, etc.), a public land mobile network (PLMN), a local area network (LAN), a wide area network (WAN), a metropolitan area network (MAN), a telephone network (e.g., the Public Switched Telephone Network (PSTN)), a near field communication (NFC) network, an ad hoc network, an intranet, the Internet, a fiber optic-based network, a cloud computing network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
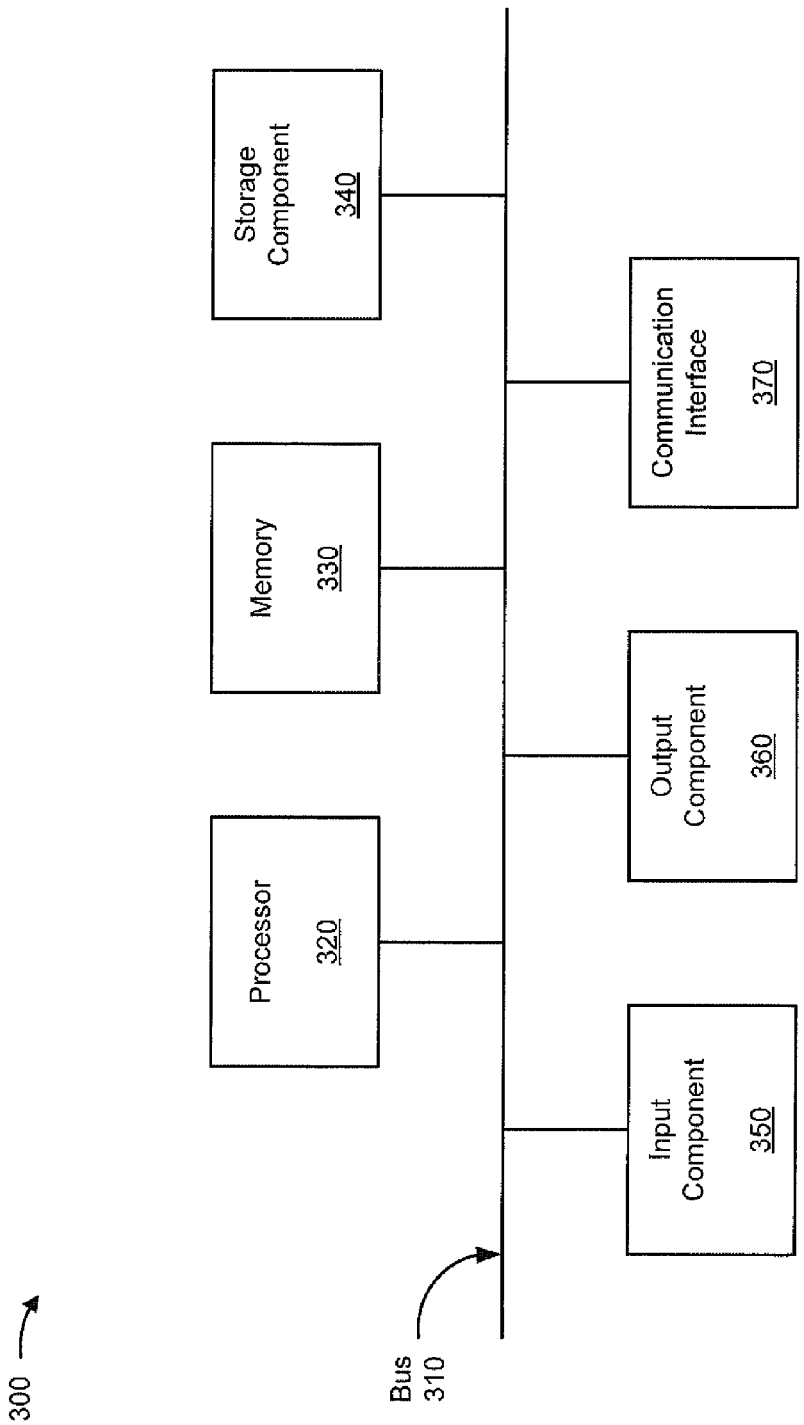
FIG. 3 is a diagram of example components of one or more devices of FIG. 2.

FIG. 3 is a diagram of example components of a device 300. Device 300 may correspond to mobile device 210, authentication device 220, client device 230, and/or third party device 240. In some implementations, mobile device 210, authentication device 220, client device 230, and/or third party device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
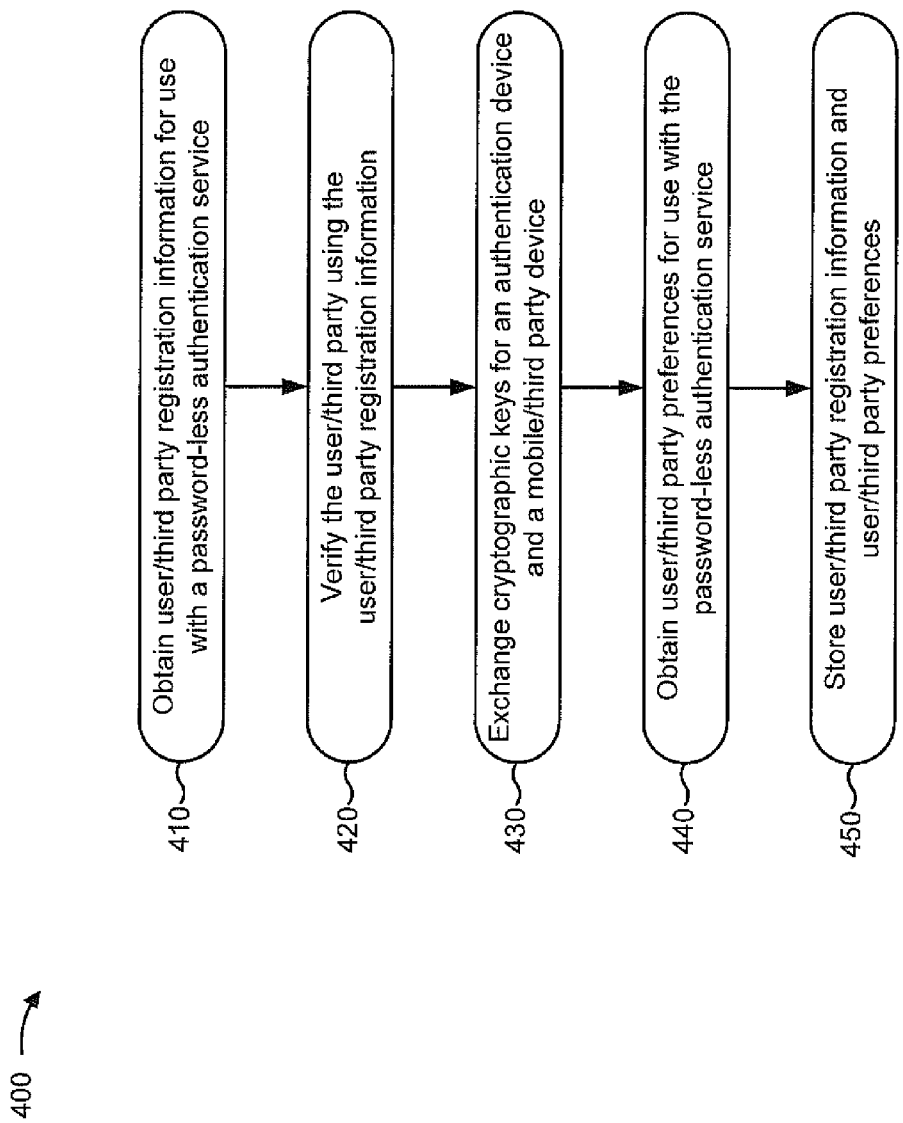
FIG. 4 is a flow chart of an example process for registering a user or a third party for a password-less authentication service.

FIG. 4 is a flow chart of an example process 400 for registering a user or a third party for a password-less authentication service. In some implementations, one or more process blocks of FIG. 4 may be performed by authentication device 220. In some implementations, one or more process blocks of FIG. 4 may be performed by another device or a group of devices separate from or including authentication device 220, such as mobile device 210, client device 230, and/or third party device 240.

As shown in FIG. 4, process 400 may include obtaining user and/or third party registration information for use with a password-less authentication service (block 410). For example, authentication device 220 may obtain user registration information (e.g., from mobile device 210 and/or client device 230), and may obtain third party registration information (e.g., from third party device 240 and/or another device). For example, a user may input user registration information via mobile device 210, and mobile device 210 may provide the user registration information to authentication device 220. Similarly, a third party administrator may input third party registration information via a device (e.g., a computing device), and the device may provide the user registration information to authentication device 220. Additionally, or alternatively, an administrator associated with the password-less authentication service may obtain the user and/or third party registration information (e.g., over the phone), and may input the registration information to a device that provides the registration information to authentication device 220. Authentication device 220 may use user registration information to register a user for a password-less authentication service, and may use third party registration information to register a third party for the password-less authentication service.

User registration information may include, for example, an email address associated with a user, a mobile device identifier associated with the user and mobile device 210 (e.g., a Mobile Telephone Number (MTN), an International Mobile Subscriber Identity (IMSI), an International Mobile Station Equipment Identity (IMEI), an Integrated Services for Digital Network (ISDN) Number, etc.), a user identifier to be used with the password-less authentication service (e.g., which may include a username, an email address, a mobile device identifier, a unique user identifier, an identifier that identifies client device 230, a vehicle identification number, etc.), a credential to be used by the user to approve access requests (e.g., a personal identification number (PIN), a keyword, an answer to a challenge question, etc.), personal information (e.g., the user's name, address, etc.), payment information to be used for password-less approval of payments (e.g., credit card information, bank information, etc.), etc. In some implementations, user registration information (e.g., an email address and/or a mobile device identifier) may be used to validate the user and complete registration.

In some implementations, authentication device 220 may determine whether the user registration information includes user registration information that has already been stored. For example, authentication device 220 may determine whether a credit card number has already been registered. In this case, authentication device 220 may notify a user associated with the credit card number (e.g., a user that previously registered the credit card number), such as by sending an email message to an email address associated with the user. Additionally, or alternatively, authentication device 220 may blacklist the credit card by preventing it from being used for future purchases. In this way, authentication device 220 may prevent a hacker from circumventing credit card protections by attempting to re-register a stolen credit card using the hacker's mobile device 210.

Third party registration information may include, for example, a name of a third party service provider registering for the password-less authentication service, a type of service offered by the third party service provider, a website identifier associated with the third party service provider, an email address associated with the third party service provider, a device identifier associated with third party device 240, payment information associated with the third party service provider (e.g., if the third party service provider pays for the password-less authentication service), etc.

As further shown in FIG. 4, process 400 may include verifying the user and/or the third party using the user and/or third party registration information (block 420). For example, authentication device 220 may verify an identity of the user using the user registration information, and/or may verify an identity of the third party using the third party registration information. As an example, authentication device 220 may transmit a verification code to a destination associated with the user and/or the third party (e.g., an email address, mobile device 210, third party server 240, etc.), and may request that the user and/or the third party provide the verification code back to authentication device 220 (e.g., via a website associated with the password-less authentication service, via a text message, via an email, etc.). Authentication device 220 may receive the input code, and may compare the input code to the transmitted verification code. If the codes match, authentication device 220 may verify the user and/or the third party.

In some implementations, authentication device 220 may cause mobile device 210 to execute a password-less authentication application, and the application may provide information, regarding mobile device 210, to authentication device 220. Authentication device 220 may use the information to verify a user of mobile device 210.

As further shown in FIG. 4, process 400 may include exchanging cryptographic keys for an authentication device and a mobile device and/or a third party device (block 430). For example, after verifying the user, authentication device 220 may exchange cryptographic keys with mobile device 210. In some implementations, authentication device 220 may provide a public key, associated with authentication device 220 (e.g., the password-less authentication service), to mobile device 210. Authentication device 220 may store a corresponding private key for use with the password-less authentication service.

Additionally, or alternatively, when mobile device 210 is verified and registered, authentication device 220 may cause mobile device 210 to generate and store a private key (e.g., associated with a digital certificate) for use with the password-less authentication service, and to provide a corresponding public key (e.g., associated with the digital certificate) to authentication device 220. Additionally, or alternatively, authentication device 220 may generate the private key and transmit the private key to mobile device 210, so long as authentication device 220 does not retain a copy of the private key. The public-private key pair for mobile device 210 may be uniquely generated based on, for example, an email address and a device identifier of mobile device 210. In this way, authentication device 220 and mobile device 210 can securely communicate using encrypted messages (e.g., via an encrypted session). Authentication device 220 may exchange cryptographic keys with third party device 240 in a similar manner.

In other words, authentication device 220 may cause mobile device 210 to obtain a digital certificate (e.g., a public key certificate). The digital certificate may include an electronic document that uses a digital signature to bind a public key with an identity (e.g., a user identity, a mobile device identity, etc.). Mobile device 210 may use the digital certificate to verify that a public key belongs to authentication device 220. Authentication device 220 may use the digital certificate to verify that a public key belongs to a user and/or mobile device 210.

As further shown in FIG. 4, process 400 may include obtaining user and/or third party preferences for use with the password-less authentication service (block 440). For example, authentication device 220 may obtain user preferences and/or third party preferences for use with the password-less authentication service. Authentication device 220 may obtain the preferences via direct input to authentication device 220 and/or via input provided via another device (e.g., mobile device 210, client device 230, third party device 240, etc.).

A user preference may include, for example, an indication of a type of access request to be notified about (e.g., a login request, a purchase request, a request regarding particular user information, etc.), a manner in which an access notification is to be provided for display via mobile device 210 (e.g., a type of information to be displayed, an amount of information to be displayed, different types and/or amounts of information to be displayed for different types of access requests, etc.), a security feature associated with a type of access request (e.g., whether a security image and/or a security keyword is to be included in an access notification, whether an access request requires the user to input a PIN to allow the access request, an amount of time to wait before denying an access request that has not been responded to, whether an access request requires the user to input biometric information to allow the access request, etc.), etc.

Similarly, a third party preference may include, for example, an indication of a type of access request for which access notifications are to be sent, a manner in which an access notification is to be provided for display via mobile device 210 (e.g., how the third party is to be identified, etc.), security information associated with a type of access request, etc. In some cases, a user preference and a third party preference may conflict. In this case, authentication device 220 may store information that identifies which preference is to be applied (e.g., a user preference may override a third party preference, or a third party preference may override a user preference).

As further shown in FIG. 4, process 400 may include storing user and/or third party registration information and user and/or third party preferences (block 450). For example, authentication device 220 may store user registration information, third party registration information, information that identifies a user preference, and/or information that identifies a third party preference. Authentication device 220 may store this information in one or more data structures. In some implementations, authentication device 220 may store information that identifies an association between a particular user identifier and a particular mobile device 210 (e.g., using a mobile device identifier). In this way, when a user attempts to access a service using the user identifier, authentication device 220 may identify mobile device 210 associated with the user, and may send an access notification to mobile device 210, as described in more detail elsewhere herein.

In some implementations, a user may revoke a digital certificate (e.g., a public-private key pair) associated with mobile device 210. For example, the user may lose mobile device 210, and may wish to revoke the digital certificate for security purposes. In this case, authentication device 220 may receive a revocation request (e.g., based on a user interaction with client device 230, based on input from another device, etc.), and may revoke the digital certificate. For example, the user may interact with client device 230 to input an email address, a device identifier, and/or a PIN used to register for the password-less authentication service, and client device 230 may provide this information to authentication device 220 along with a revocation request. When revoking the digital certificate, authentication device 220 may delete information stored in a data structure and/or may mark such information as invalid (e.g., may mark a stored public key as invalid), such as user registration information and/or user preferences.

When a user obtains a new mobile device 210, the user may register the new mobile device 210 for the password-less authentication service, as described above. In some implementations, authentication device 220 may retain information associated with the user when a digital certificate is revoked so that the user may access the information (e.g., a transaction history) when the user registers the new mobile device 210. The user may register the new mobile device 210 using a same email address, a same PIN, and/or a same mobile device identifier (e.g., the new mobile device 210 may have a same mobile telephone number as the lost/replaced mobile device 210) to associate information, previously stored in association with the lost/replaced mobile device 210, with the new mobile device 210.

Multiple user identifiers may be used in associated with a single mobile device 210, in some implementations. For example, two or more users may share a single mobile device 210. In this case, each user may register for the password-less authentication service using different user identifiers and the same device identifier. A different digital certificate (e.g., public-private key pair) may be created for each user, and stored by mobile device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of registering a user for a password-less authentication service.

Figure 5A:
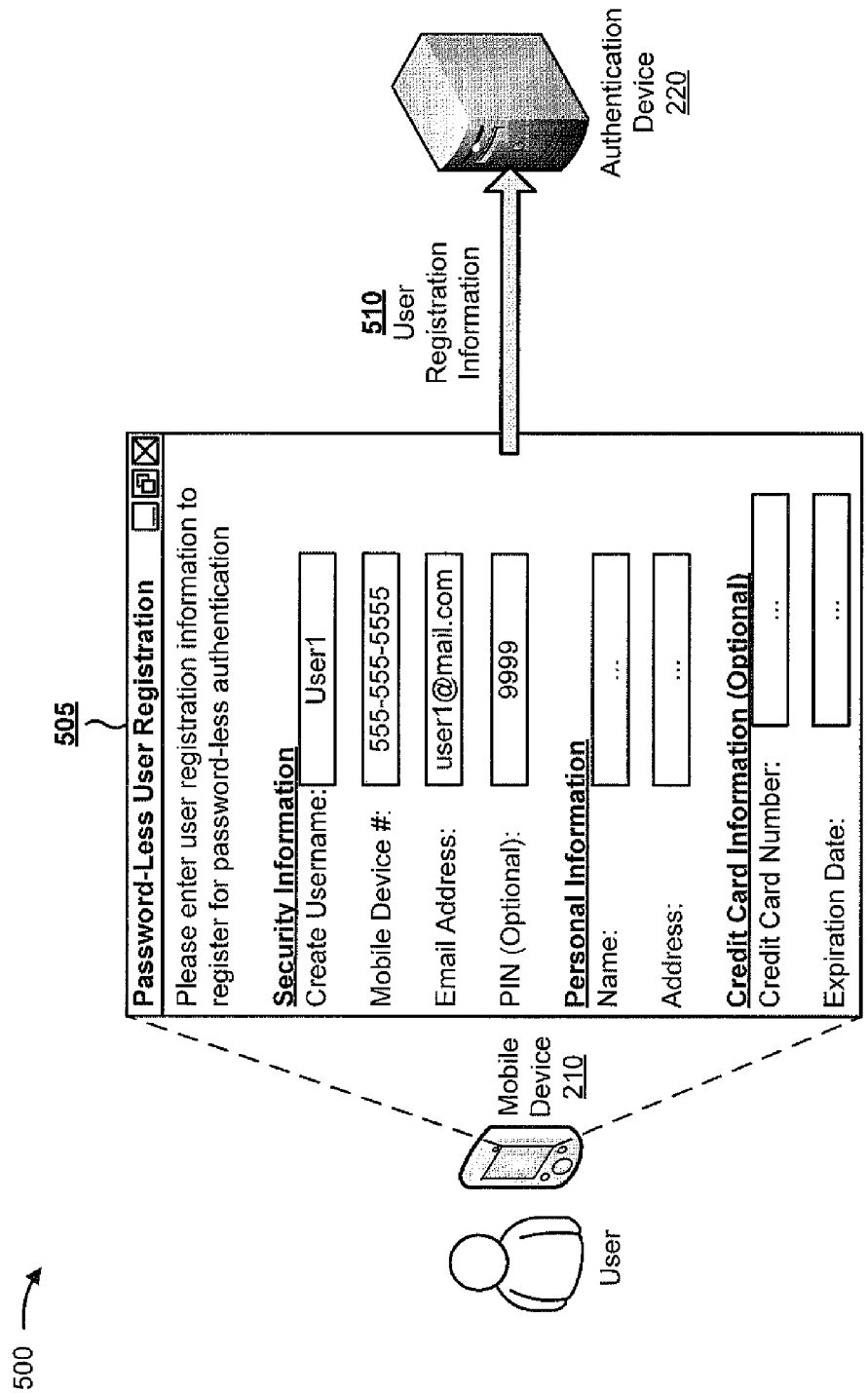

As shown in FIG. 5A, and by reference number 505, a user may interact with mobile device 210 to provide user registration information to register for a password-less authentication service. For example, assume that the user inputs a username of "User1," inputs a mobile telephone number of "555-555-5555," inputs an email address of "user1@mail.com," inputs a PIN of "9999," and inputs other user registration information, such as a name, address, credit card number, credit card expiration date, etc. As shown by reference number 510, mobile device 210 provides the user registration information to authentication device 220, which may store the user registration information.

Figure 5B:
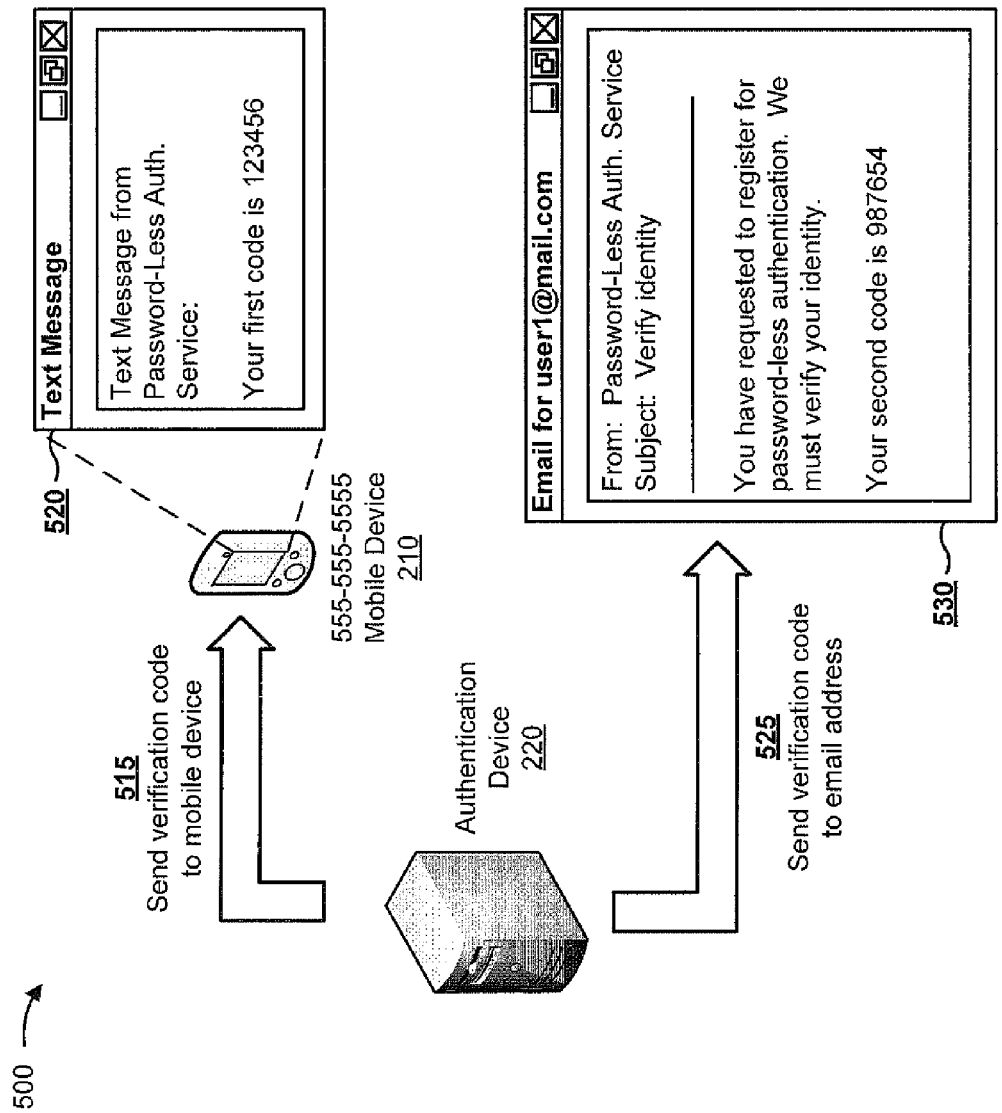

As shown in FIG. 5B, assume that authentication device 220 uses the user registration information to verify an identity of the user. For example, as shown by reference number 515, assume that authentication device 220 sends a first verification code to mobile device 210 with a mobile telephone number of 555-555-5555, identified in the user registration information as being a mobile device of User1. In one example, authentication device 220 may provide a text message to mobile device 210. As shown by reference number 520, mobile device 210 may provide the text message for display, and the text message may include the first verification code, shown as "123456."

As further shown in FIG. 5B, assume that authentication device 220 also verifies an email address of User1. For example, as shown by reference number 525, assume that authentication device 220 sends a second verification code (e.g., a different code) in an email message to an email address shown as user1@mail.com, which was identified in the user registration information as being an email address of User1. As shown by reference number 530, the user may access the email message to obtain the second verification code.

As shown in FIG. 5C, and by reference number 535, the user may obtain the codes, and may input the codes using a password-less authentication application executing on mobile device 210. Additionally, or alternatively, the user may input a PIN to be used in association with a password-less authentication service, as described elsewhere herein. In some implementations, the password-less authentication application, executing on mobile device 210, may automatically obtain the first code (e.g., from a text message, from another message that is not a text message, etc.), and may input the first code as shown in FIG. 5C. As shown by reference number 540, mobile device 210 may provide that codes and the PIN to authentication device 220, and authentication device 220 may verify the user using the first code, the second code, and/or the PIN.

Figure 5D:
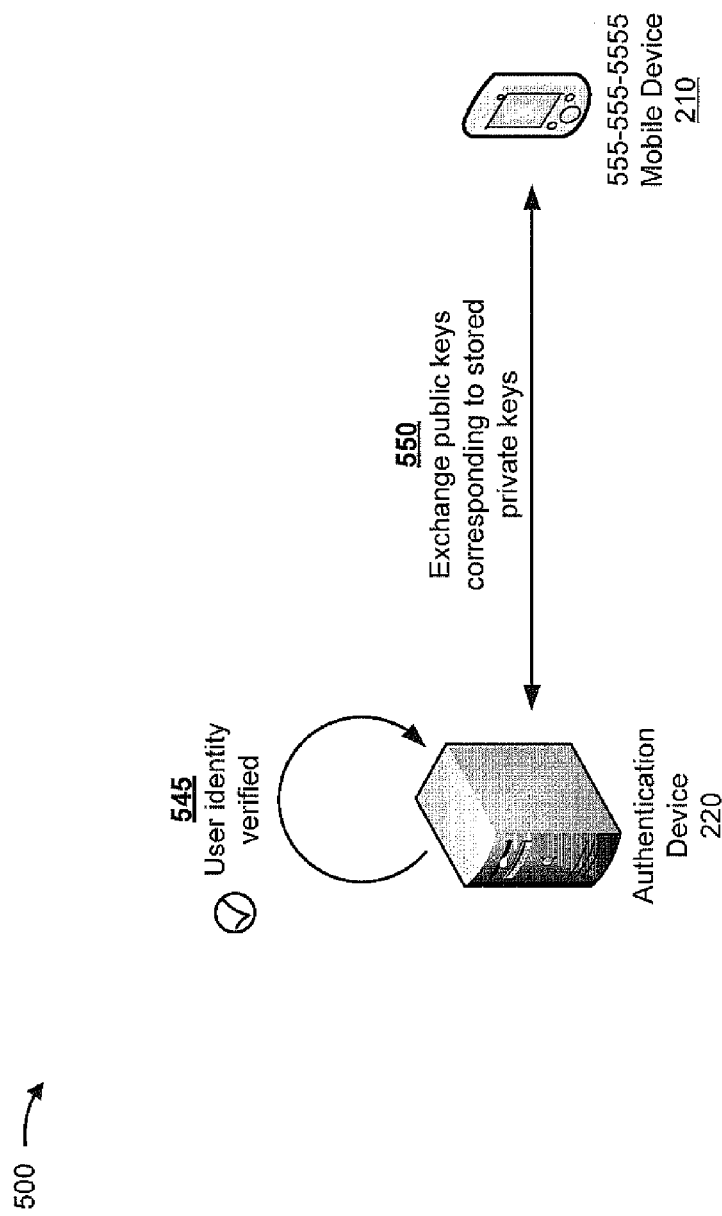

As shown in FIG. 5D, and by reference number 545, authentication device 220 may verify the identity of the user, as described above with respect to FIGS. 5A-5C. Once authentication device 220 has verified the user's identity, authentication device 220 and mobile device 210 (e.g., with an MTN of 555-555-5555) may exchange public keys that correspond to private keys stored by each device, as shown by reference number 550. In some implementations, verification of the user's identity by authentication device 220 may trigger the creation of a private key (e.g., by mobile device 210). The exchange of public keys permits mobile device 210 and authentication device 220 to communicate securely, as described in more detail elsewhere herein.

Figure 5E:
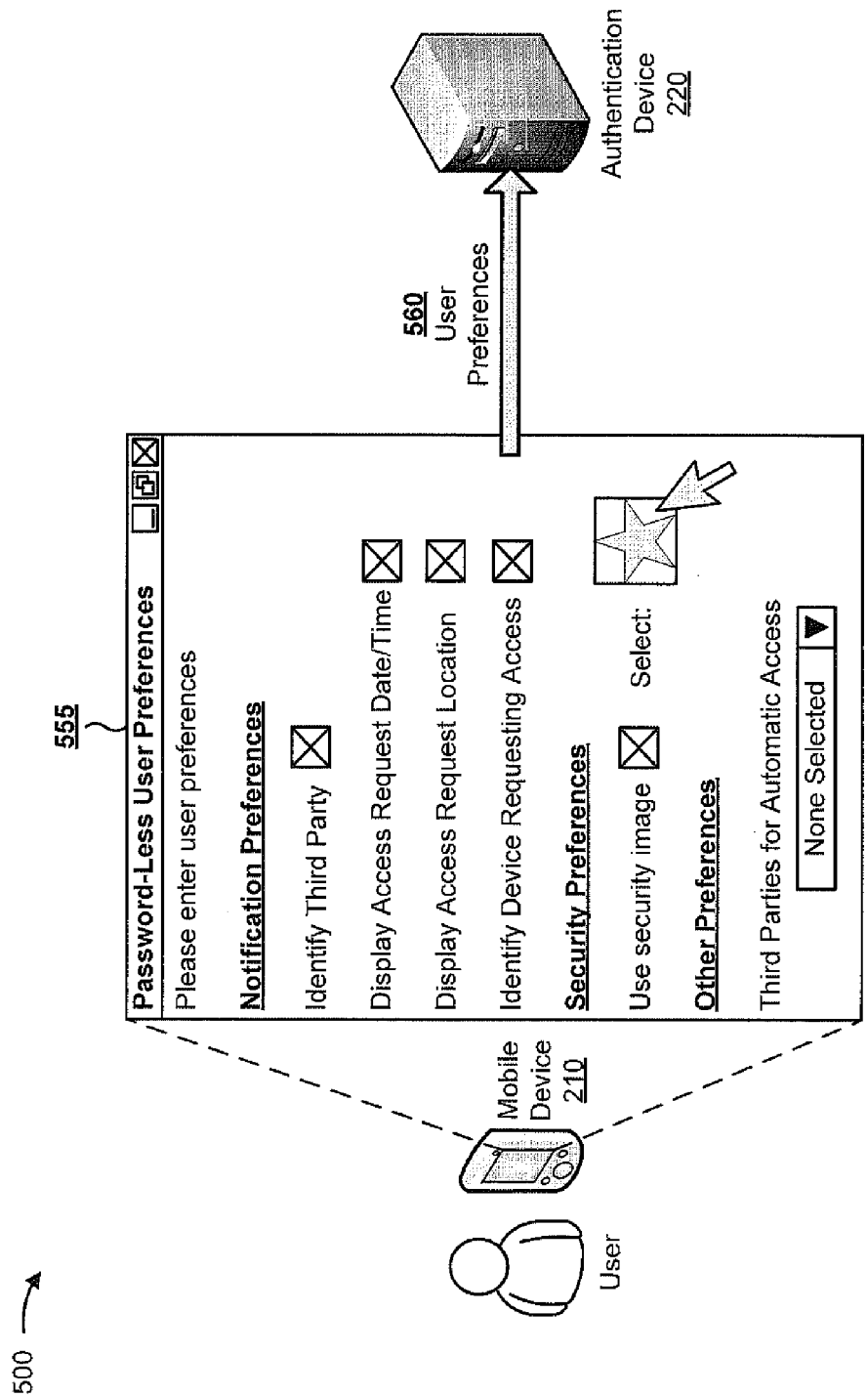

As shown in FIG. 5E, and by reference number 555, a user may interact with mobile device 210 (e.g., via a password-less authentication application) to provide user preferences for the password-less authentication service. Assume that the user inputs notification preferences that control a manner in which access notifications are provided for display via mobile device 210. For example, assume that the user inputs a preference that an access notification identify a third party associated with the access notification (e.g., the third party service being requested), identify a date and/or a time that an access request occurred, identify a location (e.g., a geographic location) where the access request occurred, and identify a device requesting the access (e.g., using a device identifier, such as a network address). Furthermore, assume that the user inputs a preference to include a security image in the access notification, and that the user selects a security image. Additionally, or alternatively, the user may input a preference to automatically approve access associated with a particular third party. As shown by reference number 560, mobile device 210 provides information identifying the user preferences to authentication device 220, which may store the information identifying the user preferences.

As indicated above, FIGS. 5A-5E are provided merely as an example. Other examples are possible and may differ from what was described with regard to FIGS. 5A-5E.

Figure 6A:
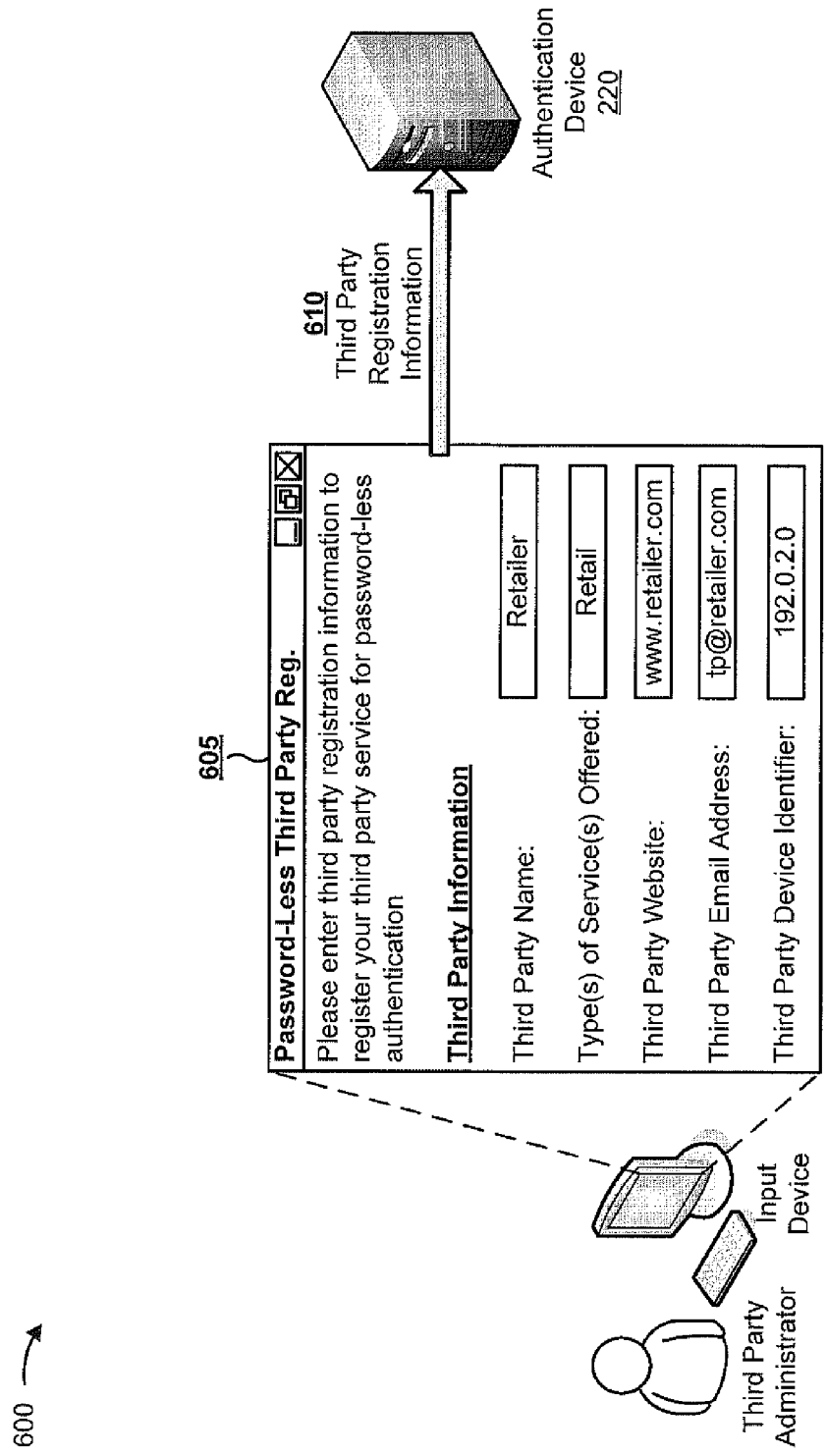
FIGS. 6A-6C are diagrams of another example implementation relating to the example process shown in FIG. 4.
Figure 6B:
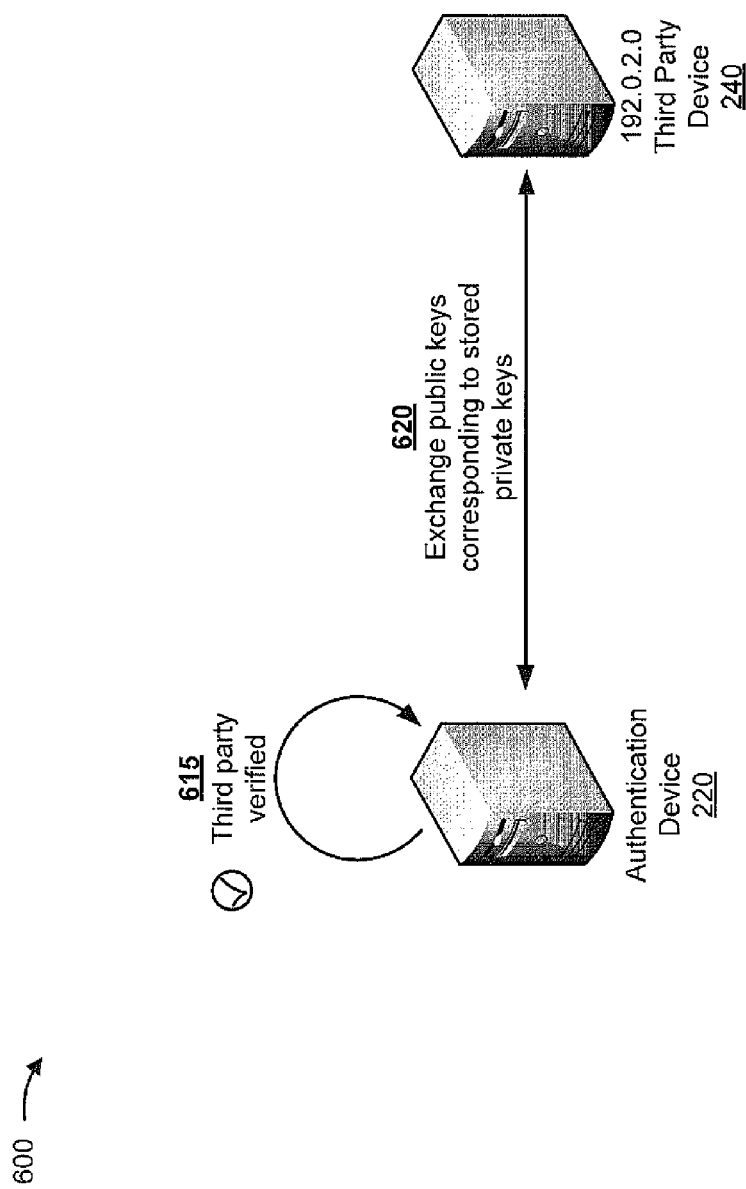
Figure 6C:
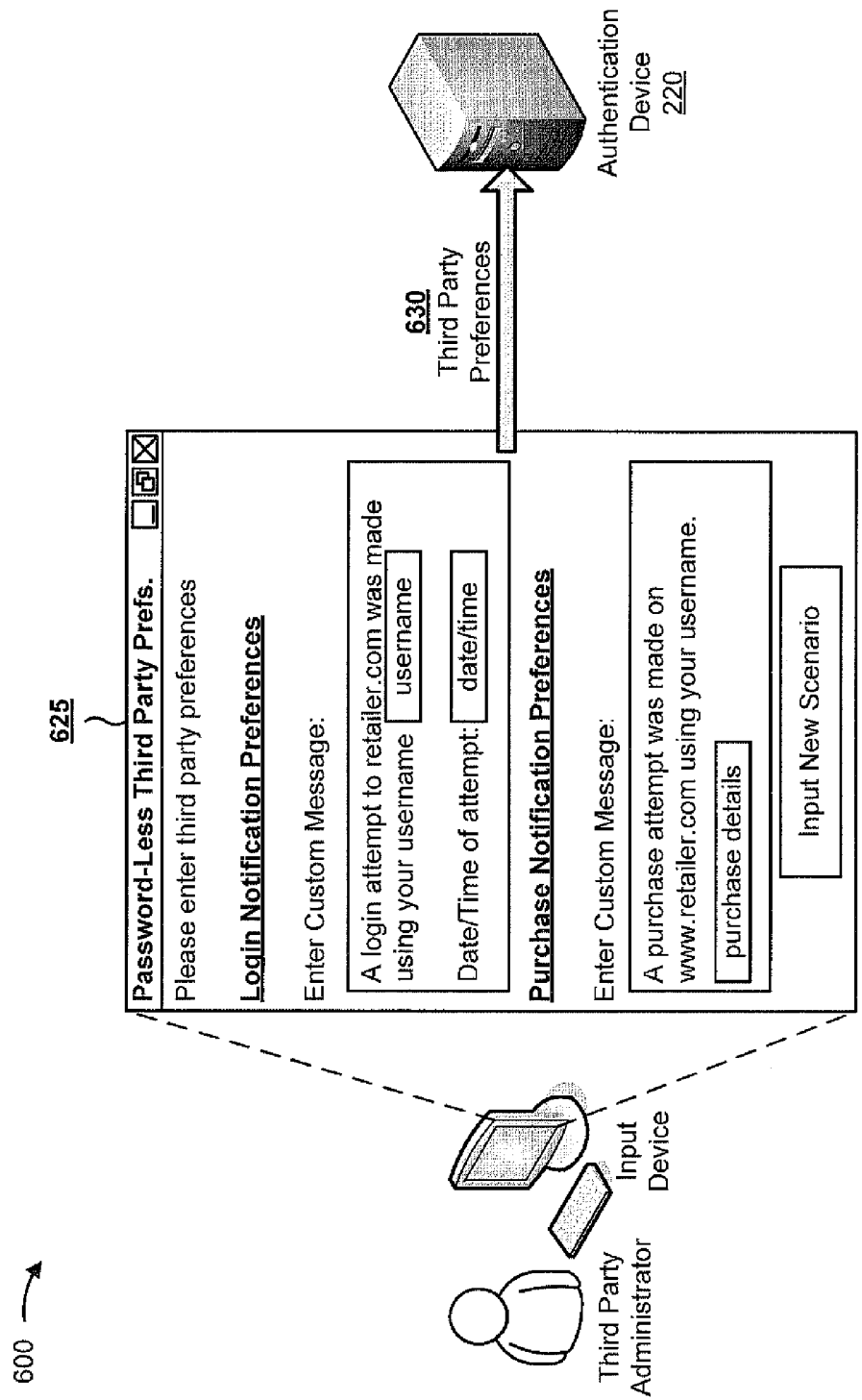

FIGS. 6A-6C are diagrams of another example implementation 600 relating to example process 400 shown in FIG. 4. FIGS. 6A-6C show an example of registering a third party for a password-less authentication service.

As shown in FIG. 6A, and by reference number 605, a third party administrator may interact with an input device (e.g., third party device 240, a client device similar to client device 230, etc.) to provide third party registration information to register for a password-less authentication service. For example, assume that the third party inputs a third party name of "Retailer," inputs a type of service offered by the third party as "Retail," inputs a third party website identifier of "www.retailer.com," inputs a third party email address of "tp@retailer.com," and inputs a third party device identifier (e.g., an Internet Protocol (IP) address) of "192.0.2.0." As shown by reference number 610, the input device provides the third party registration information to authentication device 220, which may store the third party registration information.

As shown in FIG. 6B, and by reference number 615, assume that authentication device 220 verifies the identity of the third party, such as by verifying an email address included in the third party registration information, verifying that a third party device 240 (e.g., identified by a device identifier includes in the third party registration information) is associated with the third party, etc. Once authentication device 220 has verified the third party, authentication device 220 and third party device 240 (e.g., with a network address of 192.0.2.0) may exchange public keys that correspond to private keys stored by each device, as shown by reference number 620. In some implementations, verification of the third party by authentication device 220 may trigger the creation of a private key (e.g., by third party device 240). The exchange of public keys permits third party device 240 and authentication device 220 to communicate securely, as described in more detail elsewhere herein.

As shown in FIG. 6C, and by reference number 625, a third party administrator may interact with the input device to provide third party preferences for the password-less authentication service. Assume that the third party administrator inputs notification preferences that control a manner in which different types of access notifications (e.g., that correspond to access requests for different types of services) are provided for display via mobile device 210. For example, assume that the third party inputs a first custom message to be provided for display when a user attempts to login to the third party website. The login notification may be displayed as "A login attempt to retailer.com was made using your username [insert username]. Date/time of attempt: [insert date/time]," as shown. As another example, assume that the third party inputs a second custom message to be provided for display when a user attempts to make a purchase using the third party website. The purchase notification may be displayed as "A purchase attempt was made on www.retailer.com using your username. [Insert purchase details]," as shown. In this way, the third party may customize a manner in which access notifications are provided for display to mobile device 210, and may provide access notifications for different services in a different manner. As shown by reference number 630, the input device provides information identifying the third party preferences to authentication device 220, which may store the information identifying the third party preferences.

As indicated above, FIGS. 6A-6C are provided merely as an example. Other examples are possible and may differ from what was described with regard to FIGS. 6A-6C.

FIG. 7 is a flow chart of an example process 700 for using a password-less authentication service. In some implementations, one or more process blocks of FIG. 7 may be performed by authentication device 220. In some implementations, one or more process blocks of FIG. 7 may be performed by another device or a group of devices separate from or including authentication device 220, such as mobile device 210, client device 230, and/or third party device 240.

As shown in FIG. 7, process 700 may include receiving an authentication request, from a third party device, associated with a user requesting access to a third party service (block 705), and validating the authentication request (block 710). For example, authentication device 220 may receive an authentication request from third party device 240. The authentication request may be generated and sent by third party device 240 when a user attempts to access a third party service provided by third party device 240. For example, a user may interact with client device 230 to request access, using a password-less authentication service, to a third party service provided by third party device 240, which may cause third party device 240 to generate and provide the authentication request to authentication device 220.

The authentication request may include information relating to an access request by the user to the third party service. For example, the user may input a user identifier (e.g., a username, an email address, etc.) via client device 230, and third party device 240 may include the user identifier in the authentication request. Additionally, or alternatively, the authentication request may identify a date on which the access request was made, a time at which the access request was made, a website via which the access request was made, an identity of the third party, a type of access request (e.g., a login request, a purchase request, etc.), a device identifier of third party device 240 providing the authentication request, or the like.

Authentication device 220 may validate the authentication request. In some implementations, third party device 240 may encrypt the authentication request, and may sign the authentication request using a digital signature. For example, third party device 240 may use a public key, associated with authentication device 220, to encrypt the authentication request, and authentication device 220 may use a corresponding private key to decrypt the request. Additionally, or alternatively, third party device 240 may use a private key, associated with third party device 240, to create a digital signature for the authentication request, and authentication device 220 may verify the digital signature using a corresponding public key. In this way, authentication device 220 may validate the authentication request. If the authentication request cannot be validated, then authentication device 220 may ignore the authentication request, may send a notification regarding the authentication request (e.g., to an email address associated with a password-less authentication service administrator), or the like.

As further shown in FIG. 7, process 700 may include determining a mobile device identifier of a mobile device associated with the user (block 715), and authenticating the mobile device (block 720). For example, authentication device 220 may determine a mobile device identifier (e.g., an MTN, an IMSI, etc.) that identifies mobile device 210 associated with the user requesting access to the third party service. In some implementations, authentication device 220 may determine the mobile device identifier using stored user registration information. For example, the stored registration information may include information that identifies a correspondence between a user identifier (e.g., a username, an email address, etc.) and the mobile device identifier. Authentication device 220 may determine a user identifier included in the authentication request, and may determine a mobile device identifier that corresponds to the user identifier.

Authentication device 220 may authenticate mobile device 210 identified by the mobile device identifier. For example, authentication device 220 may generate and transmit an authentication request to mobile device 210. Authentication device 220 may encrypt the authentication request using a public encryption key associated with mobile device 210, and mobile device 210 may decrypt the authentication request using the corresponding private decryption key. Additionally, or alternatively, authentication device 220 may create a digital signature for the authentication request using a private signing key associated with authentication device 220, and mobile device 210 may verify the digital signature using the corresponding public verification key. In this way, mobile device 210 may verify that the authentication request is from authentication device 220.

The authentication request may cause mobile device 210 to execute a password-less authentication application, and/or to transmit an authentication response to authentication device 220. Mobile device 210 may encrypt the authentication response using a public encryption key associated with authentication device 220, and authentication device 220 may decrypt the authentication response using the corresponding private decryption key. Additionally, or alternatively, mobile device 210 may create a digital signature for the authentication request using a private signing key associated with mobile device 210, and authentication device 220 may verify the digital signature using the corresponding public verification key. The authentication response may request that authentication device 220 provide an access notification to mobile device 210.

When authentication device 220 and mobile device 210 exchange a message, the message may be encrypted, decrypted, signed, and/or verified as described above. In this way, messages communicated between authentication device 220 and mobile device 210 may be kept secure and confidential.

As further shown in FIG. 7, process 700 may include determining whether the mobile device has been authenticated (block 725). For example, authentication device 220 may determine whether the mobile device has been authenticated based on an exchange of messages, as described in more detail elsewhere herein.

As further shown in FIG. 7, if the mobile device has not been authenticated (block 725—NO), then process 700 may include providing an instruction to prevent the user from accessing the third party service (block 730). For example, authentication device 220 may determine that mobile device 210 failed an authentication process (e.g., could not be authenticated). In some implementations, mobile device 210 may fail the authentication process if authentication device 220 does not receive an authentication response, from mobile device 210, to an authentication request (e.g., within a threshold amount of time). Additionally, or alternatively, mobile device 210 may fail the authentication process if authentication device 220 could not properly decrypt the authentication response, could not verify a digital signature include in the authentication response, and/or identifies a revoked digital certificate included in the authentication response.

If authentication device 220 determines that mobile device 210 has failed the authentication process, then authentication device 220 may provide an instruction, to third party device 240, to deny the user access to the third party service. The instruction may be provided based on the authentication request. For example, the authentication request may identify third party device 240, and authentication device 220 may provide that instruction to the identified third party device 240. The instruction may cause third party device 240 to prevent the user from accessing the third party service. Additionally, or alternatively, authentication device 220 may transmit an email message to an email address associated with a user identified in the authentication request. The email message may indicate that the user's user identifier was used to attempt to access a third party service, and that authentication of mobile device 210 failed. Additionally, or alternatively, the email message may indicate a network address (e.g., an IP address) of mobile device 210, a geographic location (e.g., determined via a global positioning system) of mobile device 210, etc. In this way, if mobile device 210 is lost or stolen, the information in the email message may assist the user in locating mobile device 210.

As further shown in FIG. 7, if the mobile device has been authenticated (block 725—YES), then process 700 may include generating and providing an access notification to the mobile device (block 735). For example, authentication device 220 may determine that mobile device 210 passed an authentication process (e.g., could be authenticated). In some implementations, mobile device 210 may pass the authentication process if authentication device 220 receives an authentication response, from mobile device 210, to an authentication request (e.g., within a threshold amount of time). Additionally, or alternatively, mobile device 210 may pass the authentication process if authentication device 220 is able to properly decrypt the authentication response, and/or is able to verify a digital signature include in the authentication response.

If authentication device 220 determines that mobile device 210 has passed the authentication process, then authentication device 220 may generate an access notification, and may provide the access notification to mobile device 210. The access notification may indicate an attempt to access the third party service, and may provide an input mechanism that permits a user of mobile device 210 to permit or deny the access. In this way, if the user is attempting to access the third party service, then the user may permit the access, and access may be provided without requiring a password. However, if another user (e.g., a hacker) is attempting to access the third party service, then the user may deny the access.

The access notification may include custom information, as described elsewhere herein. For example, a user and/or a third party may customize the access notification by inputting user preferences and/or third party preferences, and authentication device 220 may generate the access notification based on the user preferences and/or the third party preferences. As an example, the access notification may identify the third party service, may identify a third party that provides the third party service, may identify a date and/or a time that access was requested to the third party service, may identify a user identifier used to attempt to access the third party service, may identify a location (e.g., a geographic location) from which access was requested, may identify a device (e.g., client device 230) from which access was requested, etc.

In some implementations, the access notification may identify a user identifier associated with the request to access the third party service. For example, when multiple users use a single mobile device 210 (e.g., when there are multiple user identifiers associated with a single mobile device 210), a user identifier may be included in the access notification by default, so as to indicate which of the users made the request.

The access notification may include a security feature, in some implementations. For example, the access notification may include a security image, previously specified by the user, to be provided for display via mobile device 210. As another example, the access notification may include an input mechanism that requires the user to input a PIN in order to approve access. In some implementations, the access notification may require a PIN to be input by default when multiple users (e.g., multiple user identifiers) are associated with a single mobile device 210. In this way, only the user that made the request, and that knows the PIN, can approve the request.

Authentication device 220 may provide the access notification (e.g., via an encrypted, digitally signed message) to mobile device 210. Mobile device 210 may decrypt the access notification and/or verify a digital signature included in the access notification. In some implementations, mobile device 210 may use a password-less authentication application to receive the access notification, decrypt the access notification, verify a digital signature included in the access notification, provide the access notification for display, etc. Additionally, or alternatively, authentication device 220 may provide the access notification to mobile device 210 as a text message (e.g., a short message service (SMS) message, a multimedia messaging service (MMS) message, etc.).

As further shown in FIG. 7, process 700 may include receiving an access response from the mobile device (block 740), and determining whether access is approved (block 745). For example, authentication device 220 may receive an access response from mobile device 210. The access response may indicate whether to approve access to the third party service or to deny access to the third party service. For example, an access notification, provided for display via mobile device 210, may include an input mechanism that permits a user to provide input indicating whether to approve access (e.g., via an approve button, a positive response to a text message, etc.) or deny access (e.g., via a deny button, a negative response to a text message, etc.). In some implementations, authentication device 220 may receive a PIN, an answer to a challenge question, etc., from mobile device 210, and may compare this information to stored information to determine whether to approve access.

A user may interact with the input mechanism to approve or deny access, and mobile device 210 may provide the access response, indicating whether to approve or deny access based on the user interaction, to authentication device 220. Authentication device 220 may determine whether to approve or deny access based on information included in the access response. In some implementations, authentication device 220 may not receive an access response (e.g., if the user does not approve or deny access within a threshold amount of time). In this case, if authentication device 220 does not receive an access response within a threshold amount of time, then authentication device 220 may determine to deny access to the third party service.

As further shown in FIG. 7, if access is not approved (block 745—NO), then process 700 may include providing an instruction to prevent the user from accessing the third party service (block 750). For example, authentication device 220 may determine that access has not been approved (e.g., has been denied), as described above. In this case, authentication device 220 may provide an instruction, to third party device 240, to deny the user access to the third party service. The instruction may be provided based on the authentication request. For example, the authentication request may identify third party device 240, and authentication device 220 may provide that instruction to the identified third party device 240. The instruction may cause third party device 240 to prevent the user from accessing the third party service. Additionally, or alternatively, authentication device 220 may transmit an email message to an email address associated with a user identified in the authentication request. The email message may indicate that the user's user identifier was used to attempt to access a third party service, and that an access response indicated not to approve access, and/or that no access response was received.

As further shown in FIG. 7, if access is approved (block 745—YES), then process 700 may include providing an instruction to permit the user to access the third party service (block 755). For example, authentication device 220 may determine that access has been approved, as described above. In this case, authentication device 220 may provide an instruction, to third party device 240, to permit the user to access to the third party service. The instruction may be provided based on the authentication request. For example, the authentication request may identify third party device 240, and authentication device 220 may provide that instruction to the identified third party device 240. The instruction may cause third party device 240 to provide the user with access to the third party service. In some implementations, authentication device 220 and/or third party device 240 may generate a single sign-on (SSO) token to establish a session for providing access to the service. In this way, a properly authenticated user may be provided access to the third party service without using a password (or optionally using a password and/or a PIN in the access response for additional security). Because of the techniques described herein, the user can reuse a PIN/password to access multiple services (e.g., multiple websites), and can ensure that even if a malicious party obtains the PIN/password, the malicious party will not be able to gain access to the service as the user because the malicious party will not have access to the user's mobile device 210.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIGS. 8A-8F are diagrams of an example implementation 800 relating to example process 700 shown in FIG. 7. FIGS. 8A-8F show an example of using a password-less authentication service. For the purpose of FIGS. 8A-8F, assume that the example processes shown in FIGS. 5A-5E and FIGS. 6A-6C have been performed.

Figure 8A:
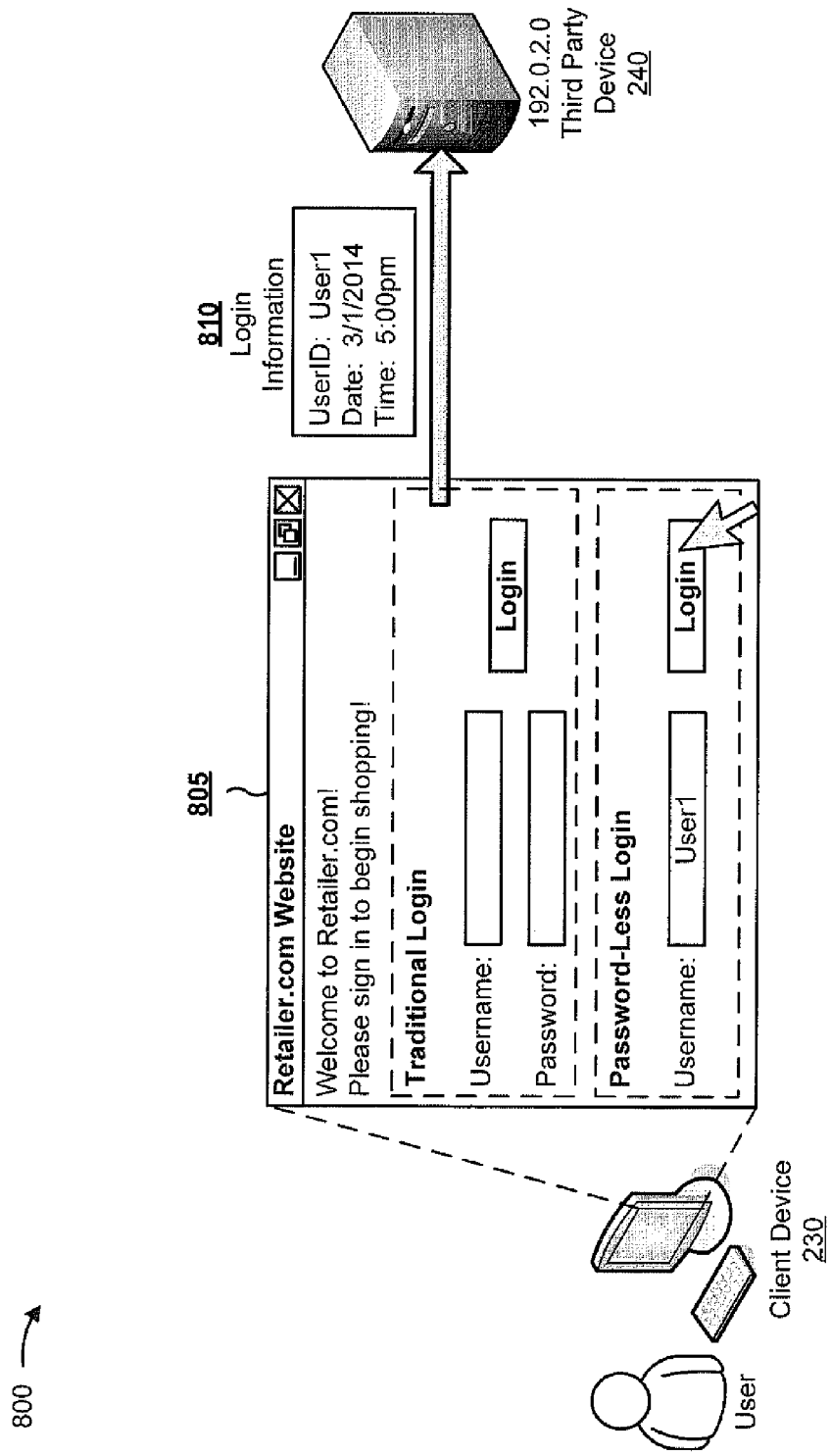

As shown in FIG. 8A, and by reference number 805, assume that a user, having registered for a password-less authentication service, navigates to a website of a third party that has also registered for the password-less authentication service. Assume that the third party, shown as Retailer.com, provides an input mechanism on the website that permits the user to input a username and log in to the website using password-less authentication. As shown, assume that the user inputs the username "User1" and interacts with a login button. As shown by reference number 810, assume that the user interaction is performed using client device 230, and that client device 230 sends login information to third party device 240, identified by a network address of 192.0.2.0 (e.g., as shown in the third party registration information of FIG. 6A. Assume that the login information identifies the username (e.g., User1), a date on which access was requested (e.g., 3/1/2014), and a time at which access was requested (e.g., 5:00 pm).

Figure 8B:
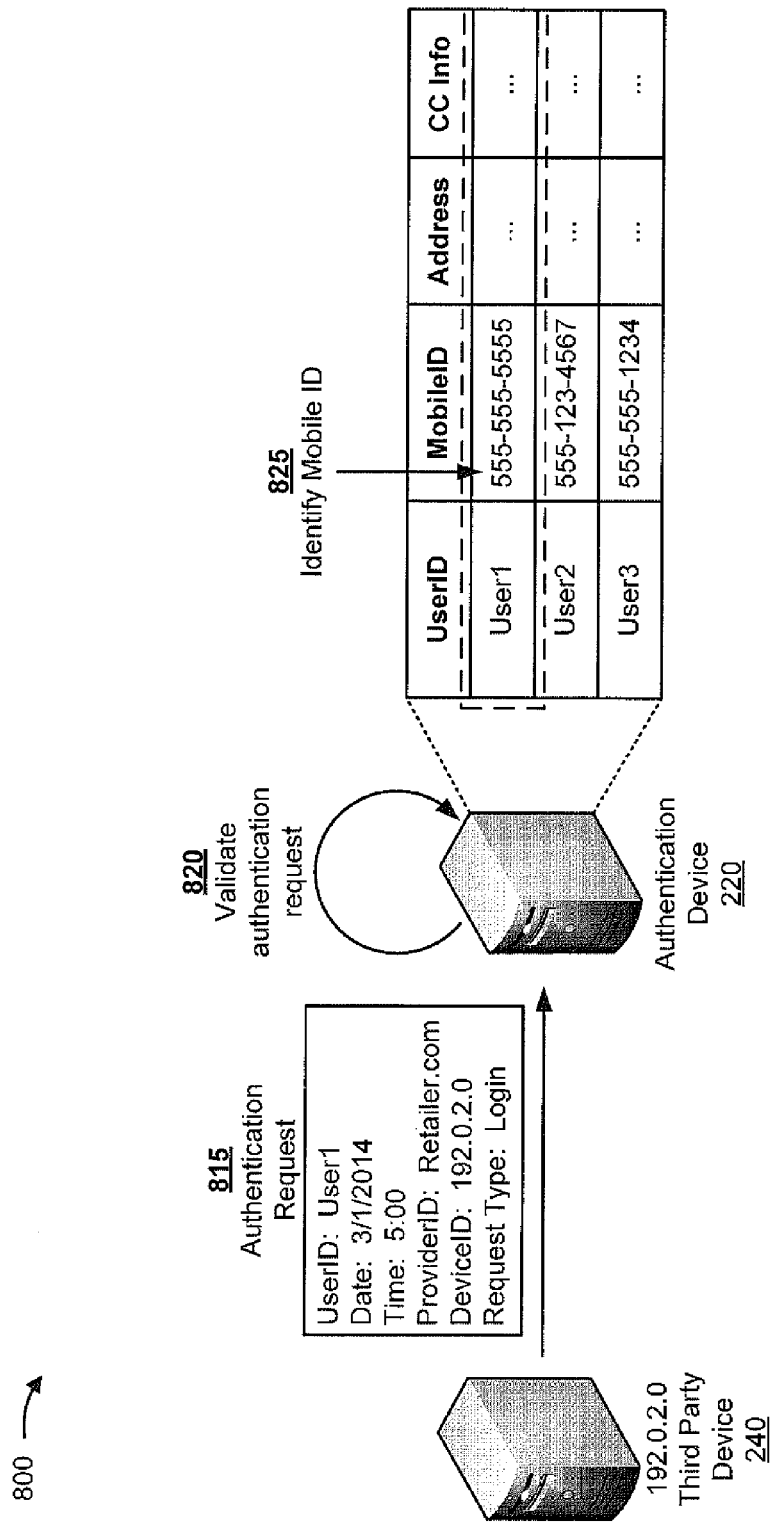

As shown in FIG. 8B, and by reference number 815, assume that third party device 240 generates an authentication request based on the login information, and provides the authentication request to authentication device 220. Assume that the authentication request includes the login information, a third party identifier (e.g., Retailer.com), a third party device identifier (e.g., 192.0.2.0), and an access request type (e.g., a "login" request). As shown by reference number 820, assume that authentication device 220 validates the authentication request, such as by decrypting the authentication request and/or verifying a digital signature included in the authentication request. As shown by reference number 825, assume that authentication device 220 uses the user identifier of User1 to identify, in a data structure stored by authentication device 220 (and/or another device), a mobile device identifier of 555-555-5555, which corresponds to the User1 user identifier.

As shown in FIG. 8C, and by reference number 830, assume that authentication device 220 sends an authentication request to mobile device 210, identified as having the mobile telephone number 555-555-5555. Additionally, or alternatively, authentication device 220 may use the mobile device identifier of 555-555-5555 to activate a password-less authentication application on mobile device 210. The password-less authentication application may handle authentication requests and/or authentication responses. As shown by reference number 835, assume that mobile device 210 sends an authentication response to authentication device 220, and requests that authentication device 220 send any stored access notifications to mobile device 210. As shown by reference number 840, assume that authentication device 220 authenticates mobile device 210 using the authentication response. If authentication device 220 cannot authenticate mobile device 210, then authentication device 220 may provide an instruction, to third party device 240, to prevent the user claiming to be User1 from logging in to the website.

Figure 8D:
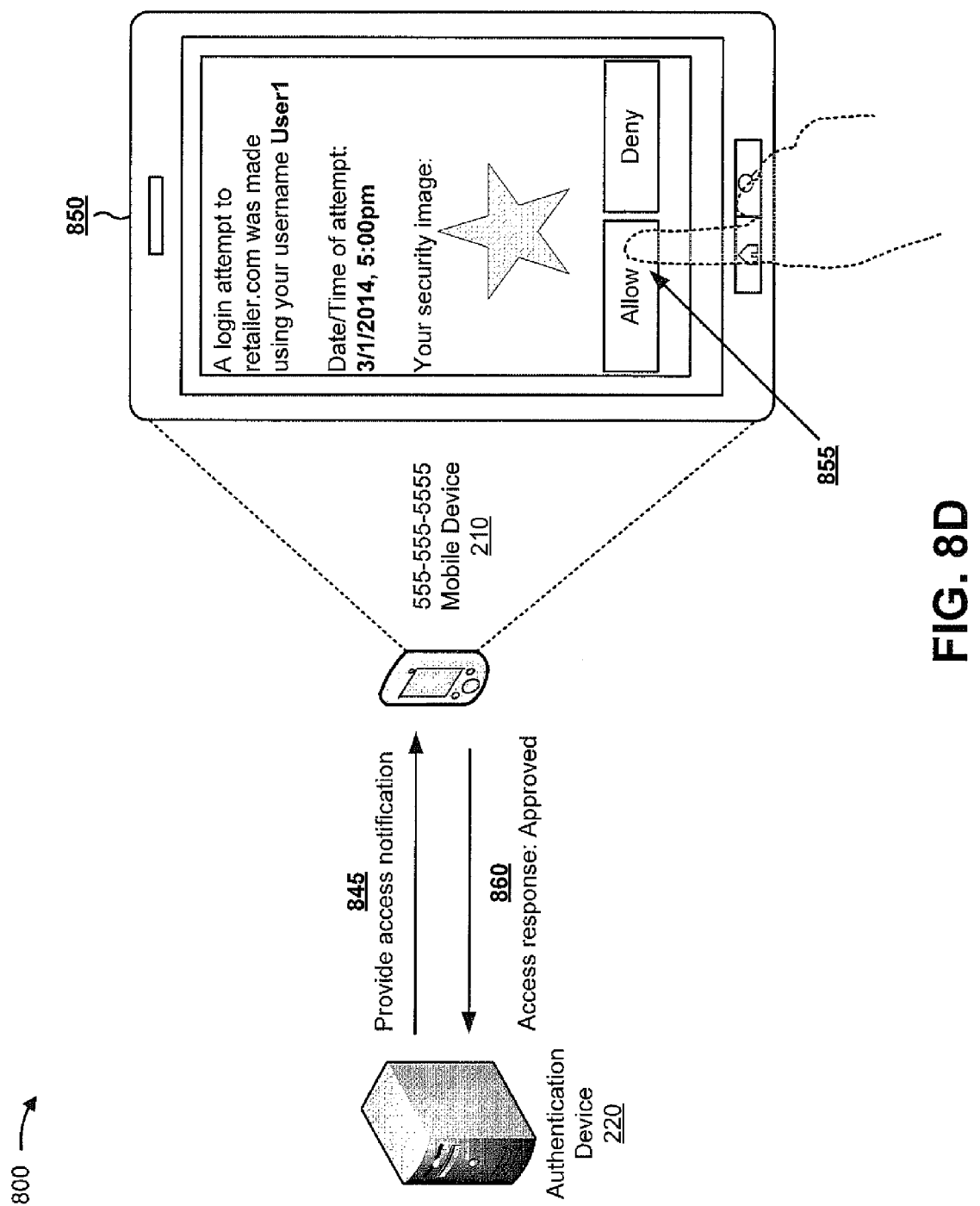

As shown in FIG. 8D, and by reference number 845, assume that authentication device 220 provides an access notification, associated with the login attempt by User1, to mobile device 210. As shown by reference number 850, assume that mobile device 210 provides the access notification for display (e.g., using a password-less authentication application). As shown, assume that the access notification identifies that a login attempt to retailer.com was made using the username User1 on 3/1/2014 at 5:00 pm. Further, assume that the access notification includes a security image previously specified by the user. Finally, assume that the access notification includes input mechanisms that permit the user to interact with mobile device 210 to cause access to the third party service to be allowed or denied.

As shown by reference number 855, assume that the user selects to allow access to the third party service. As shown by reference number 860, based on the user selection, mobile device 210 provides an access response, to authentication device 220, indicating that access has been approved.

Figure 8E:
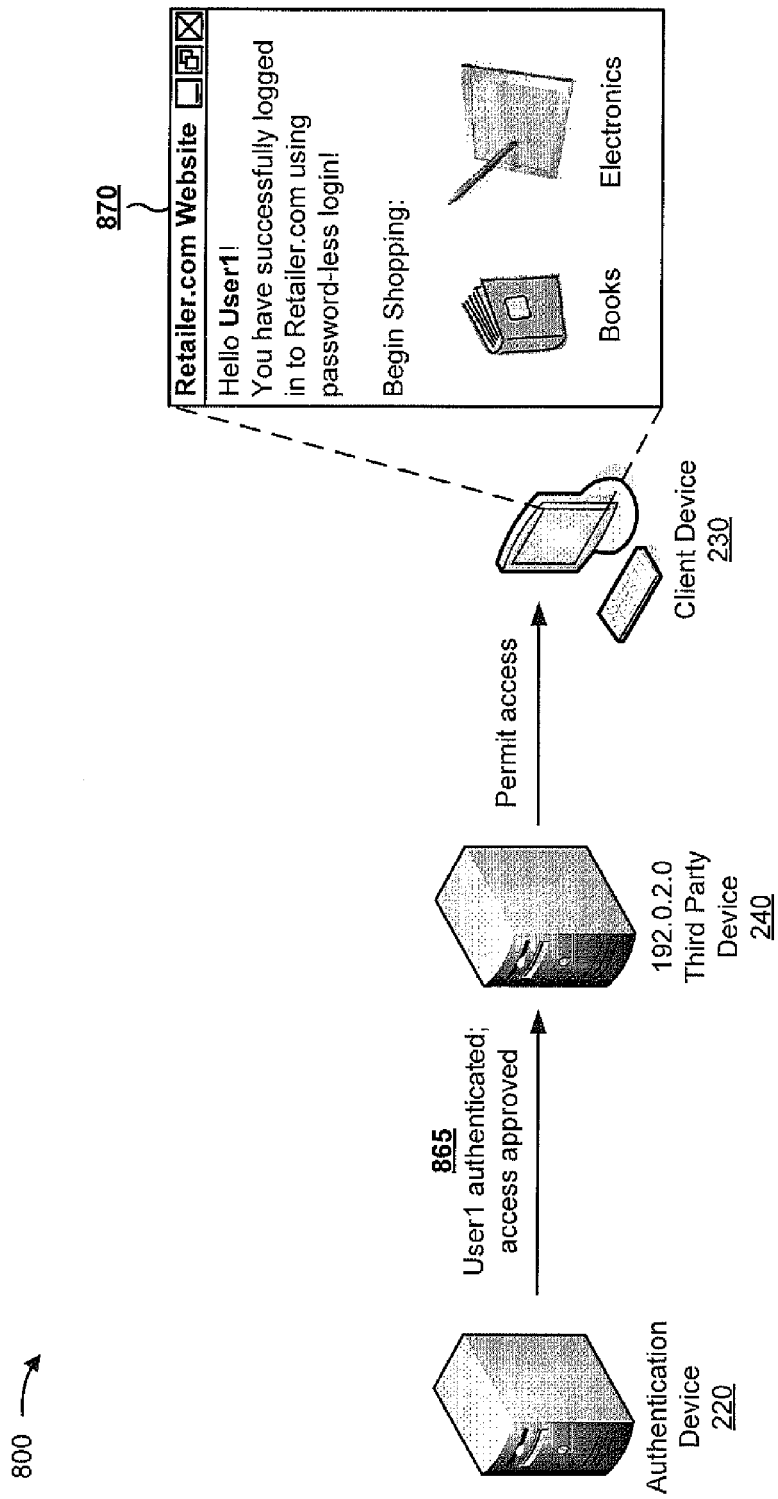

As shown in FIG. 8E, and by reference number 865, based on receiving the access response, authentication device 220 provides an indication, to third party device 240, that User1 has been authenticated and that access has been approved. Based on receiving the indication (e.g., an instruction to permit access), assume that third party device 240 permits User1 to log in to the Retailer.com website, as shown by reference number 870.

Figure 8F:
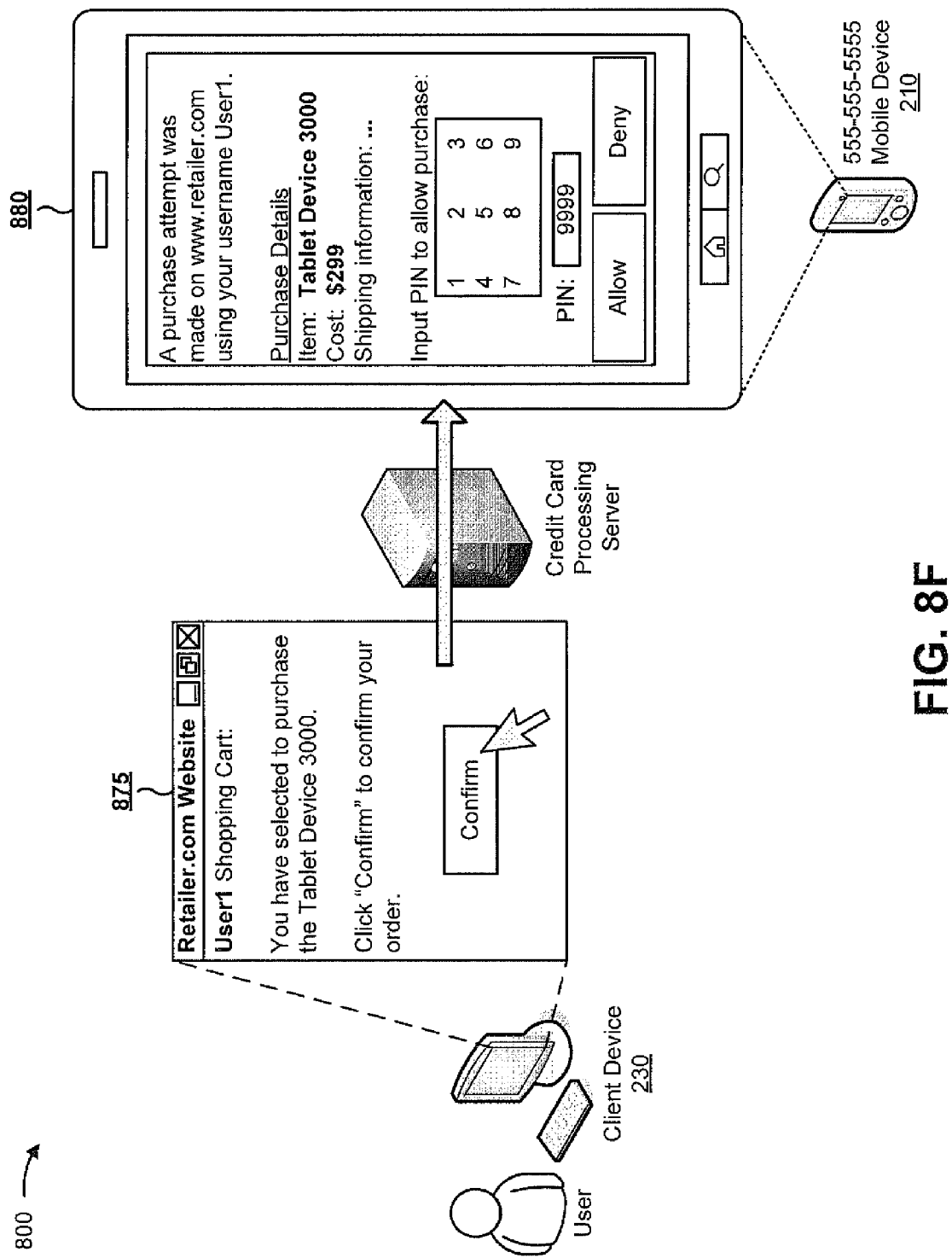

FIG. 8F shows an example of a different type of access request, and a different access notification generated based on the type of access request. FIGS. 8A-8E show an example of a login request, and FIG. 8F shows an example of a purchase request. As shown in FIG. 8F, and by reference number 875, assume that the user interacts with client device 230 to select to purchase an item shown as "Tablet Device 3000" via the Retail.com website. Assume that the user interaction causes third party device 240 to send credit card information to a credit card processing server, which transmits an authentication request to authentication device 220, which causes authentication device 220 to generate and provide an access notification to mobile device 210, as described elsewhere herein.

As shown by reference number 880, assume that mobile device 210 provides the access notification for display (e.g., using a password-less authentication application). As shown, assume that the access notification identifies that a purchase attempt on retailer.com was made using the username User1. Further, assume that the access notification identifies purchase details associated with the purchase attempt, such as information identified the item to be purchased, a cost of the item, shipping information (e.g., determined based on an address provided via user registration information), etc. Finally, assume that the access notification includes a security feature that requires the user to input a PIN (e.g., identified in the user registration information) in order to allow the purchase to be made. In this way, credit cards can be made more secure because use of a credit card will require authentication via the user's mobile device 210. If a credit card number is stolen by a thief, the thief will not be able to use the credit card number without access to the user's mobile device 210.

As indicated above, FIGS. 8A-8F are provided merely as an example. Other examples are possible and may differ from what was described with regard to FIGS. 8A-8F.

FIG. 9 is a diagram of another example implementation 900 relating to example process 700 shown in FIG. 7. FIG. 9 shows an example of using a password-less authentication service to access a voice portal (e.g., a call center).

As shown in FIG. 9, and by reference number 910, assume that a user interacts with client device 230 (e.g., a phone, which may be the same as mobile device 210) to call a voice portal service. As shown by reference number 920, assume that a voice portal device (e.g., third party device 240) and/or authentication device 220 assist in authenticating the user using a password-less authentication service. For example, assume that the user provides a user identifier (e.g., an account number, a telephone number, a username, etc.) via client device 230 (e.g., using a phone keypad, an interactive voice response system, etc.). Further, assume that authentication device 220 identifies mobile device 210 based on the user identifier, and provides an access notification to mobile device 210.

As shown by reference number 930, assume that the access notification includes a text message, and that the user may respond to the text message to allow or deny access to the voice portal. Assume that the user allows access, and that client device 230 is permitted to proceed with a call with a customer representative, as shown by reference number 940. In some implementations, a terminal used by the voice portal representative may be populated with registration information associated with the user, determined by confirming the user's identity. Additionally, or alternatively, the voice portal device may provide self-service options to mobile device 210 based on the access request being approved, as shown by reference number 950. In some implementations, the customer representative may interact with the terminal to provide information to mobile device 210 for self service.

As indicated above, FIG. 9 is provided merely as an example. Other examples are possible and may differ from what was described with regard to FIG. 9.

FIG. 10 is a diagram of another example implementation 1000 relating to example process 700 shown in FIG. 7. FIG. 10 shows an example of using a password-less authentication service to access a payment processing service via a payment gateway (e.g., using a credit card reader).

As shown in FIG. 10, and by reference number 1010, assume that a user interacts with client device 230, a credit card reader, by swiping the user's credit card. As shown by reference number 1020, assume that a payment gateway device (e.g., third party device 240) and/or authentication device 220 assist in authenticating the user using a password-less authentication service. For example, assume that client device 230 provides a user identifier (e.g., a credit card number, a name associated with a credit card, other credit card information, etc.) to a payment gateway device, such as a device associated with a credit card company. The payment gateway device may determine, based on the user identifier, a one-way hash value generated based on the credit card number and the credit card company.

Assume that the payment gateway provides the hash value to authentication device 220. In some implementations, authentication device 220 may store encrypted credit card information (e.g., a one-way hash value rather than an actual credit card number), information that identifies a merchant at which a purchase was made, and information that identifies an issuer of the credit card. In this way, authentication device 220 may not be at risk to have credit card information stolen. Assume that authentication device 220 identifies mobile device 210 based on the hash value, and provides an access notification to mobile device 210.

As shown, assume that authentication device 220 provides an access notification to mobile device 210. As shown by reference number 1030, assume that the access notification identifies information associated with the credit card purchase request, such as a third party associated with the request (e.g., a BuyHere Store), a location from which request was received (e.g., Washington, D.C.), a credit card used for the purchase request, a cost of the transaction, etc. Further, assume that a password-less authentication application that provides the access notification requires that the user input a signature in order to permit the purchase request. Assume that the user permits the request, and that client device 230 communicates with a payment processing device to approve the purchase, as shown by reference number 1040. By using a payment gateway associated with a credit card issuer, the password-less authentication service for purchases may be centralized across multiple retailers.

As indicated above, FIG. 10 is provided merely as an example. Other examples are possible and may differ from what was described with regard to FIG. 10.

Figure 11:
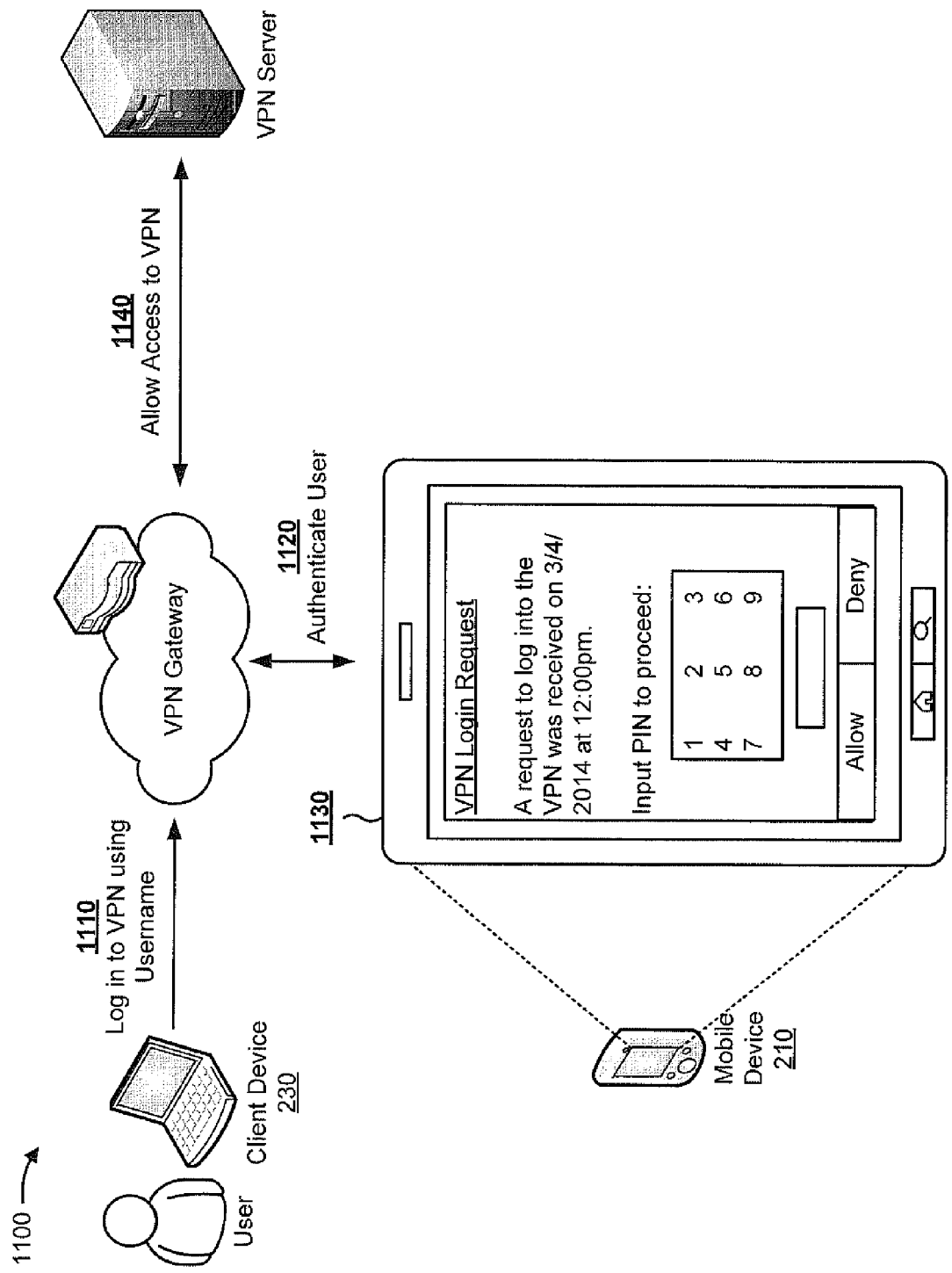

FIG. 11 is a diagram of another example implementation 1100 relating to example process 700 shown in FIG. 7. FIG. 11 shows an example of using a password-less authentication service to access a virtual private network (VPN) via a VPN gateway.

As shown in FIG. 11, and by reference number 1110, assume that a user interacts with client device 230 (e.g., a laptop) to attempt to access a VPN using the user's username or another user identifier. As shown by reference number 1120, assume that a VPN gateway device (e.g., third party device 240) and/or authentication device 220 assist in authenticating the user using a password-less authentication service. For example, assume that authentication device 220 identifies mobile device 210 based on the username or user identifier, and provides an access notification to mobile device 210. As shown by reference number 1130, assume that the access notification includes information regarding the VPN access request. Further, assume that a password-less authentication application that provides the access notification requires that the user input a PIN in order to permit the VPN access request. Assume that the user permits the request, and that VPN gateway approves access to the VPN for client device 230, as shown by reference number 1140.

As indicated above, FIG. 11 is provided merely as an example. Other examples are possible and may differ from what was described with regard to FIG. 11.

Figure 12:
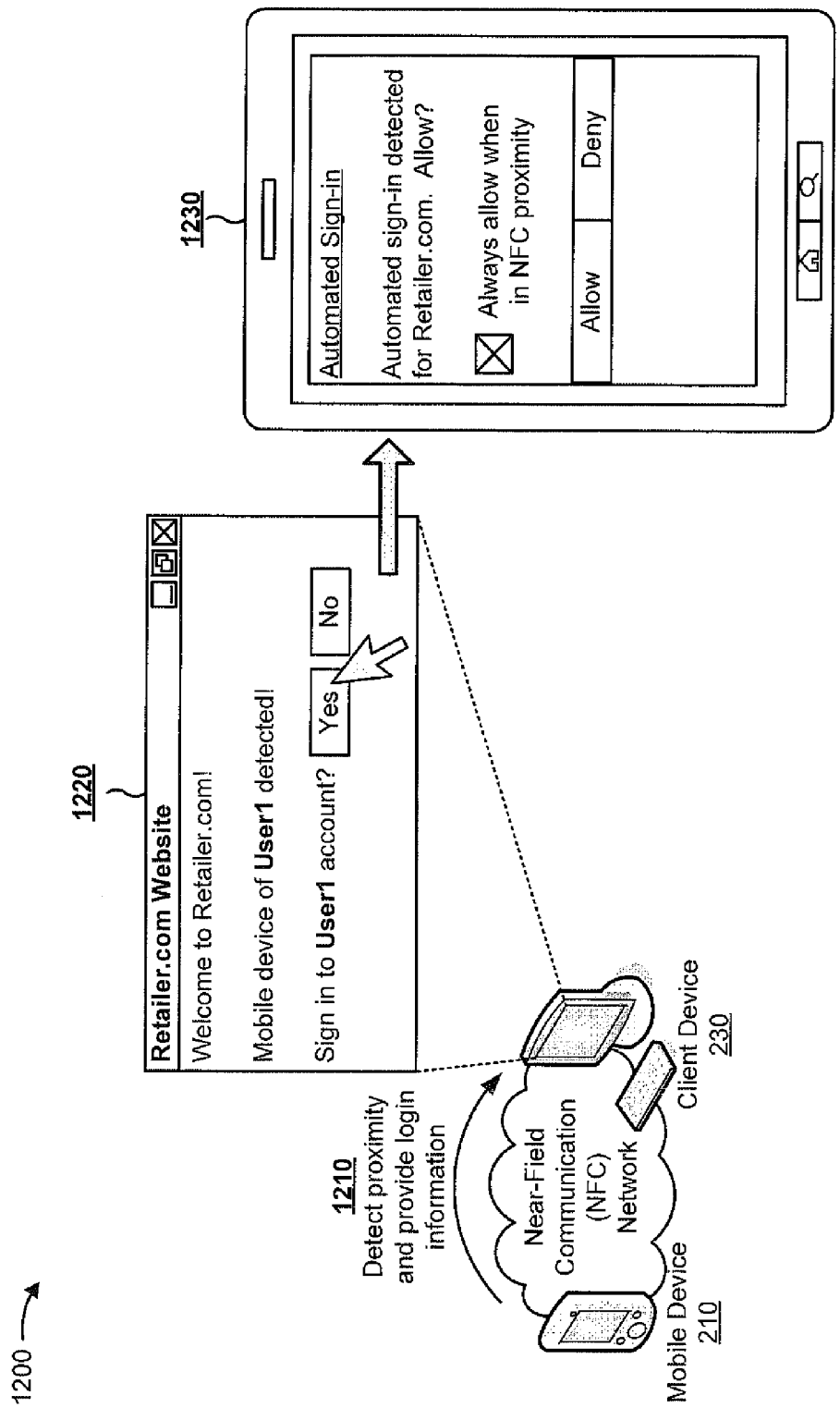

FIG. 12 is a diagram of another example implementation 1200 relating to example process 700 shown in FIG. 7. FIG. 12 shows an example of enhancing a password-less authentication service using near-field communication.

As shown in FIG. 12, and by reference number 1210, assume that mobile device 210 and client device 230 are in communication via a near-field communication (NFC) network (e.g., via Bluetooth). Assume that mobile device 210 provides login information (e.g., a username), stored by mobile device 210, to client device 230. As shown by reference number 1220, assume that the user interacts with a web browser to navigate to the Retailer.com website, and that client device 230 uses the login information to automatically populate a username field on the website with "User1." In some cases, where multiple user identifiers are associated with a single mobile device 210, the Retailer.com website may provide the multiple user identifiers for display, and may prompt the user to select a user identifier. Assume that the user selects to sign in to the User1 account, causing an access notification to be provided to mobile device 210.

As shown by reference number 1230, assume that the access notification indicates that an automated sign-in was detected on the Retailer.com website. Further, assume that the access notification provides an option for the user to automatically allow automated sign-in to the Retailer.com website, from client device 230, when mobile device 210 and client device 230 are in NFC proximity. In this way, a user may speed up the password-less authentication process for trusted services.

As indicated above, FIG. 12 is provided merely as an example. Other examples are possible and may differ from what was described with regard to FIG. 12.

FIG. 13 is a diagram of another example implementation 1300 relating to example process 700 shown in FIG. 7. FIG. 13 shows an example of using a password-less authentication service to provide parental control services for television programs provided via a set-top box.

As shown in FIG. 13, and by reference number 1310, assume that a user interacts with client device 230 (e.g., a set-top box) to attempt to access a television channel that has previously been set up to be protected via a parental protection control. As shown by reference number 1320, assume that third party device 240 and/or authentication device 220 assist in authenticating the user using a password-less authentication service. For example, assume that authentication device 220 identifies mobile device 210 based on a user identifier associated with the set-top box (e.g., a device identifier of the set-top box), and provides an access notification to mobile device 210. As shown by reference number 1330, assume that the access notification includes information regarding the requested program, such as a name of the requested program (e.g., "Star Wars"), a channel via which the requested program is to be provided (e.g., "CCC"), and a parental guidance rating associated with the program (e.g., "PG-13"). Further, assume that a password-less authentication application that provides the access notification requires that the user input a PIN in order to permit the program to be provided via the set-top box. Assume that the user permits the request, and that authentication device 220 approves access to the channel for client device 230 (e.g., via a content server), as shown by reference number 1340. In this way, a parent may use the password-less authentication service to prevent a child from watching parental-protected programs.

As indicated above, FIG. 13 is provided merely as an example. Other examples are possible and may differ from what was described with regard to FIG. 13.

FIG. 14 is a diagram of another example implementation 1400 relating to example process 700 shown in FIG. 7. FIG. 14 shows an example of using a password-less authentication service to provide access to a service protected by biometric security measures.

As shown in FIG. 14, and by reference number 1410, assume that a user interacts with client device 230, which may include a fingerprint scanner or another device that receives biometric information, to attempt to access a service protected by biometric security measures. As shown by reference number 1420, assume that third party device 240 and/or authentication device 220 assist in authenticating the user using a password-less authentication service. For example, assume that authentication device 220 identifies mobile device 210 based on a received user identifier (e.g., biometric information and/or a user identifier determined based on the biometric information), and provides an access notification to mobile device 210.

As shown by reference number 1430, assume that the access notification includes information regarding the access request protected by the biometric security measures. Assume that the user permits the request, and that authentication device 220 approves access to the service for client device 230 (e.g., a laptop that includes a fingerprint scanner), as shown by reference number 1440. In this way, a user identity, determined using biometric information, may be confirmed.

As indicated above, FIG. 14 is provided merely as an example. Other examples are possible and may differ from what was described with regard to FIG. 14.

Implementations described herein may reduce user reliance on passwords by providing a mechanism to authenticate a user via a mobile device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. In some implementations, the user interfaces may be customizable by a device and/or a user. Additionally, or alternatively, the user interfaces may be pre-configured to a standard configuration, a specific configuration based on a type of device on which the user interfaces are displayed, and/or a set of configurations based on capabilities and/or specifications associated with a device on which the user interfaces are displayed.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described herein without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An authentication device, comprising:
one or more memories storing instructions; and
one or more processors to execute the instructions to:
receive a user identifier, a personal identification number, and a device identifier associated with a user;
send a first verification code to an email address associated with the user identifier;
send a second verification code to a first device identified by the device identifier;
receive a verification response from the user;
verify the user based on the verification response including the first verification code, the second verification code, and the personal identification number;
cause the first device to generate or obtain a digital certificate based on verifying the user,
the digital certificate being uniquely associated with the user identifier and the device identifier;
store user registration information based on verifying the user,
the user registration information including the user identifier and the device identifier;
receive an authentication request generated based on a request to access a service via a second device that is different from the first device,
the authentication request including the user identifier, and
the request to access the service being generated by the second device;
identify the first device using the user identifier included in the authentication request;
authenticate the first device, using the digital certificate, based on identifying the first device;
generate an access notification based on authenticating the first device,
the access notification including information relating to the request to access the service;
provide the access notification to the first device using the device identifier;
receive an access response from the first device,
the access response indicating whether to allow or deny access to the service via the second device, and
the access response including the personal identification number when access to the service is to be allowed; and
selectively perform a first action or a second action based on the access response,
the first action including providing a first instruction to allow access to the service via the second device when the access response indicates to allow access to the service, and the second action including providing a second instruction to deny access to the service via the second device when the access response indicates to deny access to the service.

2. The authentication device of claim 1, where the one or more processors, when causing the first device to generate or obtain the digital certificate, are to:
cause the first device to generate or obtain a private cryptographic key;
where the one or more processors are further to:
obtain a public cryptographic key that corresponds to the private cryptographic key; and
receive a communication from the first device,
the communication including the digital certificate; and
where the one or more processors, when authenticating the first device, are to:
verify the digital certificate using the public cryptographic key.

3. The authentication device of claim 2, where the communication is encrypted using the private cryptographic key; and
where the one or more processors are further to:
decrypt the communication using the public cryptographic key.

4. The authentication device of claim 1, where the digital certificate is a first digital certificate;
where the one or more processors are further to:
verify a third party associated with providing the service; and
cause a third party device, associated with the third party, to generate or obtain a second digital certificate based on verifying the third party;
where the one or more processors, when receiving the authentication request, are to:
receive the authentication request from the third party device; and
where the one or more processors are further to:
verify the authentication request using the second digital certificate.

5. The authentication device of claim 1, where the one or more processors are further to:
receive information that identifies a user preference that controls a manner in which the access notification is provided for display via the first device; and
where the one or more processors, when generating the access notification, are to:
generate the access notification based on the user preference.

6. The authentication device of claim 1, where the one or more processors, when providing the access notification, are to:
provide the access notification for display via the first device,
the access notification including information that identifies the service and a date or time associated with the request to access the service.

7. The authentication device of claim 1, where the one or more processors are further to:
receive information that identifies a service type of the service being requested; and
where the one or more processors, when generating the access notification, are to:
generate the access notification based on the service type.

8. A non-transitory computer-readable medium storing instructions, the instructions comprising:
one or more instructions that, when executed by one or more processors, cause the one or more processors to:
receive a user identifier, a personal identification number, and a device identifier associated with a user;
send a first verification code to an email address associated with the user identifier;
send a second verification code to a mobile device identified by the device identifier;
receive a verification response from the user;
verify the user based on the verification response including the first verification code, the second verification code, and the personal identification number;
store user registration information based on verifying the user,
the user registration information including the user identifier and the device identifier;
receive, from a third party device, an authentication request generated based on a request, by a client device, to access a service provided by the third party device,
the authentication request including the user identifier;
identify the mobile device associated with the user identifier;
authenticate the mobile device, using a digital certificate, based on identifying the mobile device;
generate an access notification based on authenticating the mobile device,
the access notification including information relating to the request to access the service;
provide the access notification to the mobile device to cause the access notification to be provided for display via the mobile device;
receive an access response from the mobile device based on an interaction with the access notification,
the access response indicating whether to permit the client device to access the service provided via the third party device, and
the access response including a signature of the user of the mobile device when the client device is to be permitted to access the service; and
selectively perform a first action or a second action based on the access response,
the first action including providing a first instruction, to the third party device, to permit access to the service via the client device when the access response indicates to permit access to the service, and
the second action including providing a second instruction, to the third party device, to deny access to the service via the client device when the access response indicates to deny access to the service.

9. The non-transitory computer-readable medium of claim 8, where the digital certificate is generated or obtained by the mobile device based on verifying the user, and
where the digital certificate is uniquely associated with the user identifier and the device identifier.

10. The non-transitory computer-readable medium of claim 8, where the one or more instructions, when executed by the one or more processors, further cause the one or more processors to:
obtain information that identifies a first credential associated with verifying the access response;

identify a second credential included in the access response; and
determine whether the first credential and the second credential match; and
where the one or more instructions, that cause the one or more processors to selectively perform the first action or the second action, cause the one or more processors to:
selectively perform the first action or the second action based on determining whether the first credential and the second credential match,
the first action being performed based on determining that the first credential and the second credential match, and
the second action being performed based on determining that the first credential and the second credential do not match.

11. The non-transitory computer-readable medium of claim 8, where the one or more instructions, when executed by the one or more processors, further cause the one or more processors to:
determine a service type of the service being requested; and
determine whether to include a security feature in the access notification based on the service type of the service being requested,
the security feature including a security image, a request for biometric information of the user, or a request for a personal identification information of the user; and
where the one or more instructions, that cause the one or more processors to generate the access notification, cause the one or more processors to:
selectively include the security feature in the access notification based on determining whether to include the security feature in the access notification,
the security feature being included in the access notification when the service type is a first service type, and
the security feature being excluded from the access notification when the service type is a second service type that is different from the first service type.

12. The non-transitory computer-readable medium of claim 8, where the request to access the service includes at least one of:
a login request, or
a purchase request.

13. The non-transitory computer-readable medium of claim 8, where the one or more instructions, when executed by the one or more processors, further cause the one or more processors to:
receive information that identifies a third party preference that controls a manner in which the access notification is provided for display via the mobile device; and
where the one or more instructions, that cause the one or more processors to generate the access notification, cause the one or more processors to:
generate the access notification based on the third party preference.

14. The non-transitory computer-readable medium of claim 8, where the one or more instructions, when executed by the one or more processors, further cause the one or more processors to:
determine that a plurality of user identifiers are associated with the mobile device,
the plurality of user identifiers including the user identifier; and
where the one or more instructions, that cause the one or more processors to generate the access notification, cause the one or more processors to:
include a security feature in the access notification based on determining that the plurality of user identifiers are associated with the mobile device,
the security feature including a security image, a request for biometric information of the user, or a request for a personal identification information of the user.

15. A method, comprising: receiving, by an authentication device, a user identifier, a personal identification number, and a device identifier associated with a user; sending, by the authentication device, a first verification code to an email address associated with the user identifier; sending, by the authentication device, a second verification code to a mobile device identified by the device identifier; receiving, by the authentication device, a verification response from the user; verifying, by the authentication device, the user based on the verification response including the first verification code, the second verification code, and the personal identification number, storing, by the authentication device, user registration information based on verifying the user, the user registration information including the user identifier and the device identifier; receiving, by the authentication device, an authentication request generated based on a request to access a service, the authentication request including the user identifier; identifying, by the authentication device, the mobile device associated with the user identifier; authenticating, by the authentication device, the mobile device; generating, by the authentication device, an access notification based on authenticating the mobile device, the access notification including information relating to the request to access the service; providing, by the authentication device, the access notification to the mobile device; receiving, by the authentication device, an access response from the mobile device based on providing the access notification to the mobile device, the access response indicating whether to permit access to the service, and the access response including biometric information of the user of the mobile device when access to the service is permitted; and selectively performing, by the authentication device, a first action or a second action based on the access response, the first action including causing access to the service to be permitted when the access response indicates to permit access to the service, and the second action including causing access to the service to be denied when the access response indicates to deny access to the service.

16. The method of claim 15, where the access notification includes a first input mechanism and a second input mechanism,
the first input mechanism permitting the user to interact with the access notification to provide a first indication to permit access to the service, and
the second input mechanism permitting the user to interact with the access notification to provide a second indication to deny access to the service;
where the method further comprises:
determining whether the access response includes the first indication or the second indication; and
where selectively performing the first action or the second action includes:

selectively performing the first action or the second action based on determining whether the access response includes the first indication or the second indication,
the first action being performed when the first indication is received, and
the second action being performed when the second indication is received.

17. The method of claim 15, further comprising:
causing the mobile device to generate or obtain a digital certificate based on verifying the user,
the digital certificate being uniquely associated with the user identifier and the device identifier.

18. The method of claim 17, where causing the mobile device to generate or obtain the digital certificate comprises:
causing the mobile device to generate or obtain a private cryptographic key;
where the method further comprises:
obtaining a public cryptographic key that corresponds to the private cryptographic key; and
receiving a communication from the mobile device,
the communication including the digital certificate; and
where authenticating the mobile device comprises:
verifying the digital certificate using the public cryptographic key.

19. The method of claim 18, further comprising:
receiving an indication to revoke the digital certificate; and
deleting the public cryptographic key based on receiving the indication to revoke the digital certificate.

20. The method of claim 15, further comprising:
receiving information that identifies a service type of the service; and
where generating the access notification comprises:
generating the access notification based on the service type.

* * * * *